United States Patent
Karunwi

(10) Patent No.: US 11,256,340 B2
(45) Date of Patent: Feb. 22, 2022

(54) SYSTEM HAVING ERGONOMIC HANDHELD INTEGRATION OF USER INTERFACE DEVICES

(71) Applicant: Adebowale Karunwi, Bowie, MD (US)

(72) Inventor: Adebowale Karunwi, Bowie, MD (US)

(*) Notice: Subject to any disclaimer, the term of this patent is extended or adjusted under 35 U.S.C. 154(b) by 0 days.

(21) Appl. No.: 16/517,243

(22) Filed: Jul. 19, 2019

(65) Prior Publication Data

US 2020/0379578 A1    Dec. 3, 2020

Related U.S. Application Data

(60) Provisional application No. 62/770,292, filed on Nov. 21, 2018, provisional application No. 62/764,140, filed on Jul. 19, 2018.

(51) Int. Cl.
*G06F 3/02* (2006.01)
*G06F 3/0354* (2013.01)
*G06F 3/16* (2006.01)

(52) U.S. Cl.
CPC ........ *G06F 3/0219* (2013.01); *G06F 3/03543* (2013.01); *G06F 3/167* (2013.01); *G06F 2203/0332* (2013.01); *G06F 2203/0384* (2013.01)

(58) Field of Classification Search
CPC .. G06F 3/0219; G06F 1/1626; G06F 3/04886; G06F 1/1664; G06F 3/0216; G06F 3/0237; G06F 1/1662; G06F 3/0202; G06F 3/0236; G06F 3/0238; G06F 1/1671; G06F 3/03543; H04M 1/23
USPC ...................... 345/163, 168, 172; 341/20, 22
See application file for complete search history.

(56) References Cited

U.S. PATENT DOCUMENTS

| | | | |
|---|---|---|---|
| 4,849,732 A | 7/1989 | Dolenc | |
| 4,880,968 A * | 11/1989 | Kwang-Chien | ....... G06F 3/0317 250/221 |
| 4,913,573 A | 4/1990 | Retter | |
| 4,917,516 A | 4/1990 | Retter | |

(Continued)

OTHER PUBLICATIONS

Dell.com, "3Dconnexion SpaceMouse Enterprise." https://www.dell.com/en-us/work/shop/accessories/apd/a9150557.

(Continued)

*Primary Examiner* — Koosha Sharifi-Tafreshi
(74) *Attorney, Agent, or Firm* — Rosenberg, Klein & Lee

(57) ABSTRACT

A system provides for ergonomic handheld integration of multiple user interface devices. The system includes a housing defining an internal compartment and including an upper frame extending over the internal compartment. The upper frame defines a peripheral portion and an intermediate support portion, where the intermediate support portion is at least partially raised above the peripheral portion. A pointing device portion is coupled to the housing, which pointing device portion includes a positional tracking sensor disposed in the internal compartment and at least one control button coupled in depressible manner to the upper frame. A keyboard portion is coupled to the housing, which keyboard portion includes a plurality of keys distributed over at least first and second keyboard sections to collectively define a substantially complete keyboard of predetermined type. The first and second keyboard sections are divided by the intermediate support portion extending therebetween.

17 Claims, 25 Drawing Sheets

(56) References Cited

U.S. PATENT DOCUMENTS

| | | |
|---|---|---|
| 5,063,376 A | 11/1991 | Chang |
| 5,457,480 A | 10/1995 | White |
| 5,583,497 A | 12/1996 | Hankes |
| 5,847,695 A | 12/1998 | Duncan et al. |
| 5,936,555 A | 8/1999 | Zagnoev |
| 6,088,022 A | 7/2000 | Rakoski |
| 6,765,502 B2 | 7/2004 | Boldy et al. |
| 8,130,200 B2* | 3/2012 | Slotznick ............ G06F 3/04886 345/169 |
| D658,649 S | 5/2012 | Mody et al. |
| 9,256,296 B2 | 2/2016 | Tagge |
| 2004/0159779 A1* | 8/2004 | Duff ...................... G06F 3/0219 250/221 |
| 2005/0057508 A1* | 3/2005 | Kim ...................... G06F 3/0233 345/163 |
| 2005/0146497 A1* | 7/2005 | Clapper ........... H04N 21/42206 345/156 |
| 2006/0007151 A1* | 1/2006 | Ram ................... G06F 3/03543 345/163 |
| 2008/0174553 A1* | 7/2008 | Trust .................... G06F 3/0202 345/163 |
| 2010/0281184 A1* | 11/2010 | Chang ................ G06F 3/03543 710/13 |
| 2014/0333537 A1* | 11/2014 | Kim ................... G06F 3/04886 345/163 |

OTHER PUBLICATIONS

NewEgg.com, "AULA Excalibur Master One-hand Gaming Keyboard." https://www.newegg.com/p/32N-000V-00041.

\* cited by examiner

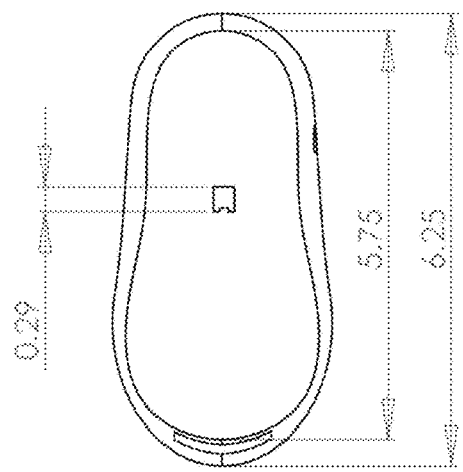
FIG. 7A
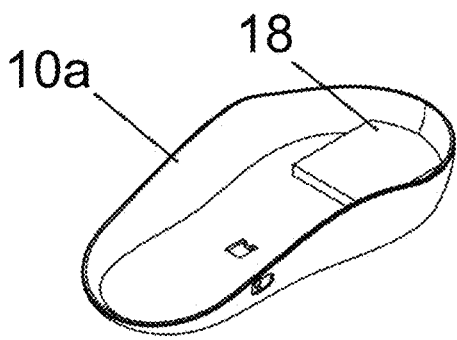
FIG. 7
FIG. 7B
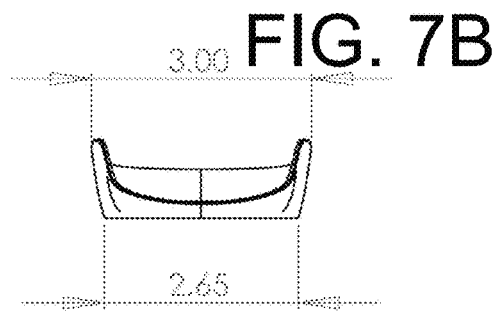
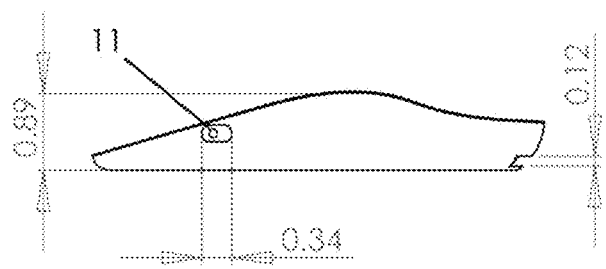
FIG. 7C
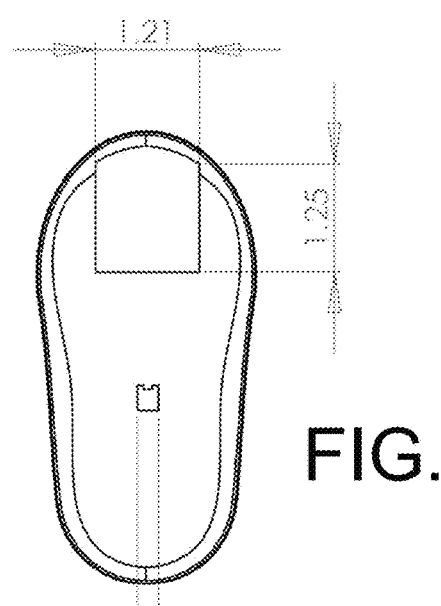
FIG. 7D

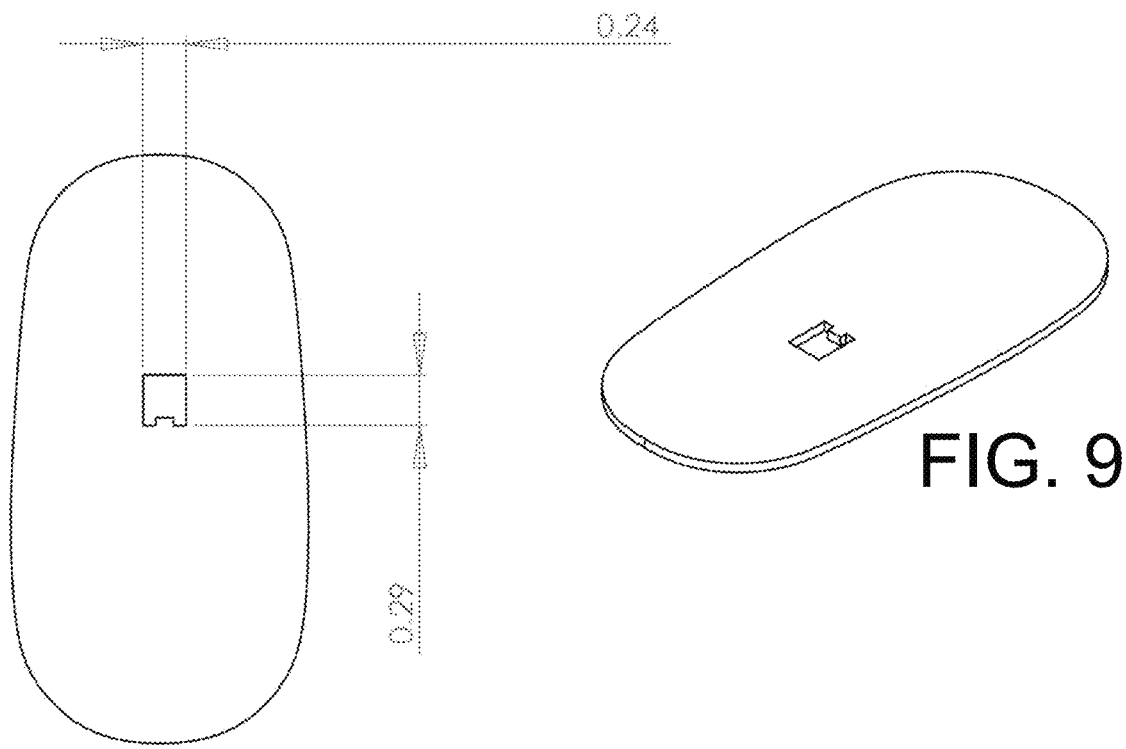
FIG. 9
FIG. 9A
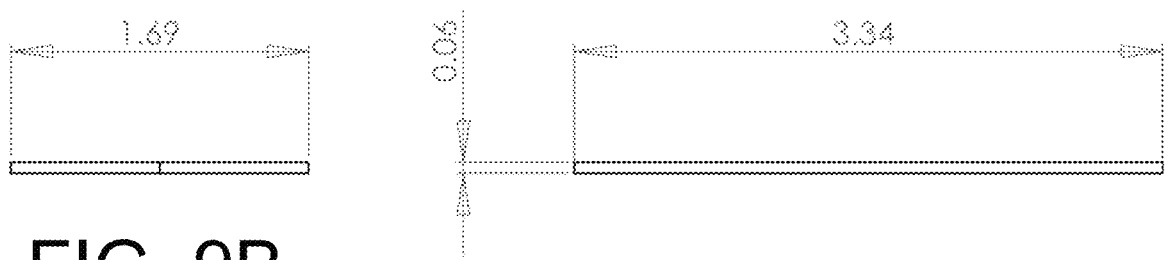
FIG. 9B
FIG. 9C

SYSTEM HAVING ERGONOMIC HANDHELD INTEGRATION OF USER INTERFACE DEVICES

RELATED PATENTS AND APPLICATIONS

This Application is based on U.S. Provisional Patent Application No. 62/764,140, filed on Jul. 19, 2018, and also based on U.S. Provisional Patent Application No. 62/770,292, filed on Nov. 21, 2018. Both Provisional Applications are incorporated herein by reference.

BACKGROUND OF THE INVENTION

The subject system is generally directed to ergonomic handheld integration of multiple user interface device capabilities. The system provides a user with convenient non-interfering access to a combination of handheld interface control capabilities such as those of a pointing device (for example, a mouse or the like) and of a full function keyboard, amongst possible others. The interface control capabilities are incorporated in such manner that each is readily accessible to a user without inadvertently accessing the other. That is, despite the combined access to the multiple interface control capabilities, each interface control capability may be accessed and used free of undue interference by the other.

With the ever-growing use of computers and computer-based systems, and the growing sophistication of software executed thereon, the combined use of multiple devices to interface with a computer is now as ubiquitous as it is necessary. Users sitting at their stations find themselves banging on their keyboards to type, while invariably reaching for pointing devices like a computer mouse to manipulate a cursor to quickly navigate through and within displayed image screens. In doing so, they endure the drawbacks of inconvenience, discomfort, and inefficiency moving his/her hands between the keyboard and pointing device, resigned to those drawbacks as a necessary cost to working with computers. Over periods of extended use, however, the cumulative effects of the wasted time and effort going from one device to another cannot be ignored, especially as more and more individuals spend increasingly longer periods of time working, studying, playing, viewing, communicating, researching, creating, shopping, socializing, transacting business, and conducting other aspects of their lives using computers.

The need on occasion to work with a portable storage device such as an SD memory card, or a Mini-SD memory card, adds to the drawbacks, as a user must typically reach over to and around the computer's processing unit housing to interconnect the memory card device at the appropriate connector/port, then resume his/her position for operating the keyboard and pointing device. The drawbacks are particularly apparent for those with physical disabilities like impaired bodily movement, impaired vision, and such for whom the constant back and forth movement and re-handling required to adequately control the multiple interface devices tends to be laborious and difficult, if not impossible.

There is need for a system which provides simple and convenient access to such multiple user interface devices, whereby a user may easily and comfortably interact with various computers and computer-based systems. There is need for a handheld system which provides combined yet ergonomically accommodating access to various combinations of such common user interface devices like a pointing device, a fully functional keyboard, a pointing device select key, an alert mechanisms, a memory device, and the like.

SUMMARY OF THE INVENTION

An object of the present invention is to provide a system that enables simple and convenient access to multiple user interface devices for interacting with various computers and computer-based systems.

Another object of the present invention is to provide a handheld system that enables combined yet ergonomically accommodating access to various combinations of user interface devices like a pointing device, a fully functional keyboard, among other things.

These and other objects are attained in a system formed in accordance with an exemplary embodiment of the present invention, which provides for ergonomic handheld integration of multiple user interface devices. The system includes a housing defining an internal compartment and including an upper frame extending over the internal compartment. The upper frame defines a peripheral portion and an intermediate support portion, where the intermediate support portion is at least partially raised above the peripheral portion. A pointing device portion is coupled to the housing, which pointing device portion includes a positional tracking sensor disposed in the internal compartment and at least one control button coupled in depressible manner to the upper frame. A keyboard portion is coupled to the housing, which keyboard portion includes a plurality of keys distributed over at least first and second keyboard sections to collectively define a substantially complete keyboard of predetermined type. The first and second keyboard sections are divided by the intermediate support portion extending therebetween.

A handheld system formed in accordance with certain embodiments provides for ergonomic integration of multiple user interface devices. The system includes a housing having an upper frame and a base part coupled thereto to define an internal compartment therebetween. The upper frame includes a peripheral portion and an intermediate support portion protruding upward across the peripheral portion to define a humped upper profile. A pointing device portion is coupled to the housing, which pointing device portion includes a positional tracking sensor disposed in the internal compartment and at least one control button coupled in depressible manner to the upper frame. A keyboard portion is coupled to the housing, which keyboard portion includes a plurality of keys distributed over a forward keyboard section and a rear keyboard section to collectively define a substantially complete keyboard of predetermined type. The forward and rear keyboard sections are exposed through the upper frame of the housing and divided by the intermediate support portion extending laterally therebetween. The intermediate support portion defines a raised surface for resting a part of a user's hand when gripping and operating either of the pointing device and keyboard portions.

A system is formed in accordance with certain other embodiments provides for ergonomic handheld integration of multiple user interface devices. The system includes a housing including an upper frame and a base part coupled thereto to define an internal compartment therebetween. The upper frame includes a peripheral portion and an intermediate support portion extending across the peripheral portion, and the intermediate support portion is at least partially raised above the peripheral portion. A mouse portion is coupled to the housing, and the mouse portion includes a positional tracking sensor disposed in the internal compartment and at least one control button coupled in depressible manner to the upper frame. A keyboard portion is coupled to the housing, and the keyboard portion includes a plurality of keys distributed over at least forward and rear keyboard sections to collectively define a substantially complete keyboard of predetermined type. The forward and rear keyboard sections are divided by the intermediate support portion extending laterally therebetween. The predetermined type for the keyboard portion is selected from the group consisting of: QWERTY, AZERTY, QWERTZ, Dvorak, Colemak, Maltron, and JCUKEN keyboard types.

BRIEF DESCRIPTION OF THE DRAWINGS

FIGS. 7-7D are comparative perspective, bottom plan, front elevational, side elevational, and top plan schematic views of an isolated part of the housing in the embodiment of the system shown in FIG. 1;

FIGS. 9-9C are comparative perspective, top plan, front elevational, and side elevational schematic views of an isolated part of the housing in the embodiment of the system shown in FIG. 1;

DETAILED DESCRIPTION OF THE PREFERRED EMBODIMENTS

Figure 1:
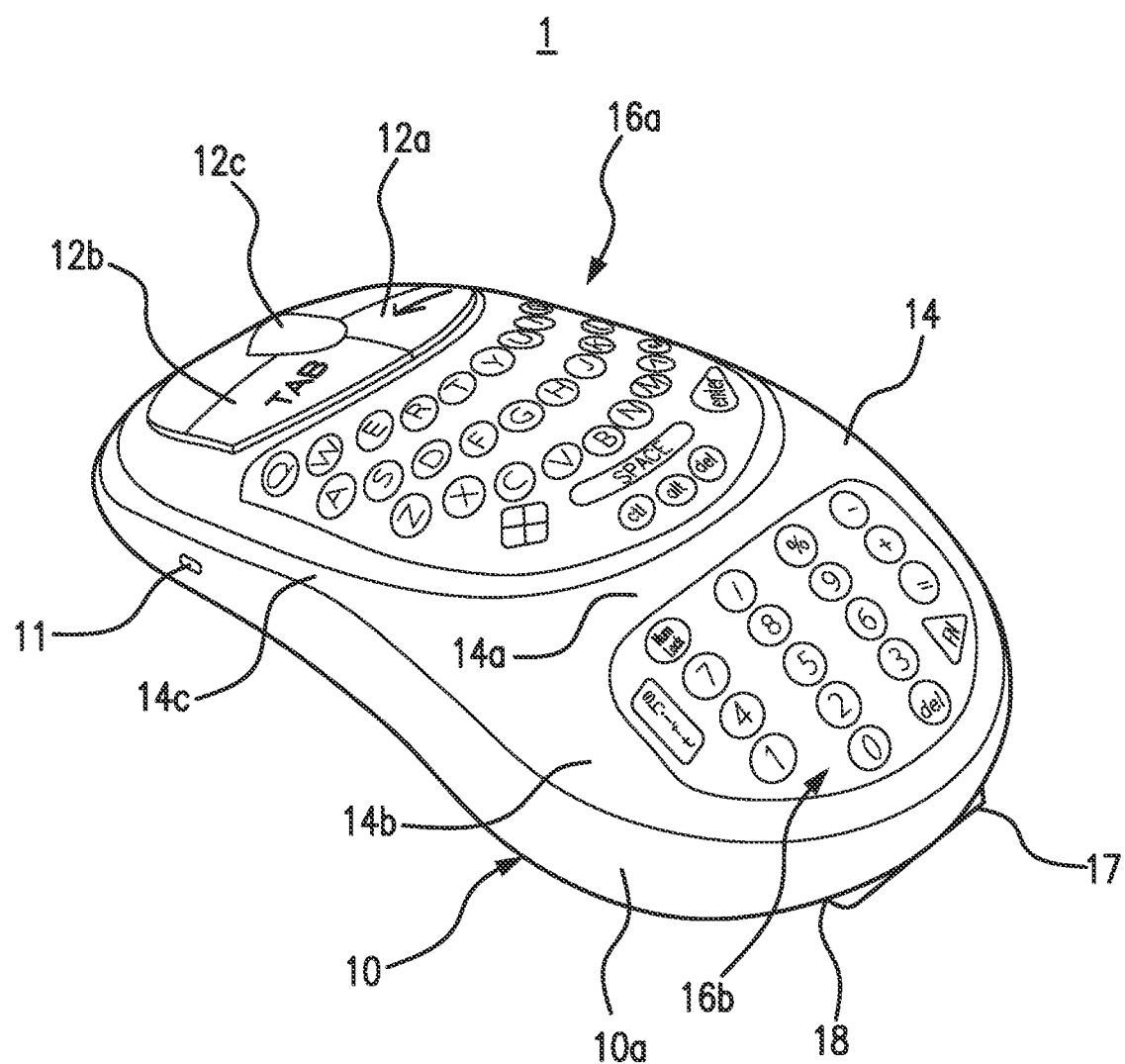
FIG. 1 is a perspective view of a system formed in accordance with one exemplary embodiment of the present invention.

Reference will now be made in detail to exemplary embodiments, which are illustrated in the accompanying drawings, wherein like reference numerals refer to the like elements throughout. Illustrative embodiments are described below in order to explain the disclosed system and method with reference to the figures shown in the drawings for certain exemplary embodiments for sample applications.

Full keyboard formats known in the art include the so-called QWERTY, AZERTY, QWERTZ, Dvorak, Colemak, Maltron, JCUKEN, and the like. In accordance with certain aspects of the present invention, the subject system provides for ergonomic handheld integration of multiple user interface devices, which preserves the feel and function of a conventional pointing device such as a mouse equipped with one or more 'clickable' buttons, and which also incorporates a substantially fully equipped keyboard of suitable format known in the art. The keyboard is incorporated in such manner that it does not interfere with operability of the pointing device or any control mechanism such as a clickable button or rollable wheel/ball, yet provides ready access to its various alphanumeric character, function, control, and other such keys without undue risk of unintentional key actuation. Moreover, the keyboard is incorporated in such manner that the keyboard does not disrupt the ergonomic qualities of the given pointing device, and permits the user to utilize the natural resting points for his/her hand in selectively operating one of the pointing control or keyboard features without undue contortion of the hand or fingers to avoid breaching or encroaching on the other.

Combination user interface devices are generally known in the art. Touch pads, manipulable balls, or pointing buttons are incorporated for instance in designated areas of known keyboards. But such combination devices known in the art fail solve problems often encountered during typical use. For example, fixed-position pointing devices such as incorporated in these types of keyboards make for inhibited (or muted) pointing operation when compared to other handheld and/or displacement-type pointing devices. With known displacement type pointing devices like conventional computer mice, coordinated use of the mouse, along with a storage device like an SD card, and a fully equipped keyboard device is typically quite cumbersome in practice. Utilization by most users typically requires scattered, oft-fumbling actions to repeatedly move the hands from one device to the other and back in carrying out the necessary user controls.

The subject system having ergonomic handheld integration of user interface devices brings these functional features/elements together to be quite literally at one's fingertips, or within the palm of one's hand. Accordingly, computer pointing control, key-entry of information, and even insertion and removal of storage media by the user may be manipulated and controlled with minimal extraneous movement. Coordinated control may be carried out without having to release the handheld system, and without having to move one's arms or re-position one's body to do so. Such control may be conveniently and fully performed using but one hand and the digits of that hand.

As noted, this simplifies computer use by individuals with disabilities like blindness. In addition to obviating the need to repeatedly find and re-find discrete user interface devices, the subject system preferably also includes an audio command or function verbalizing and/or audial announcing feature in certain embodiments and applications. In certain other embodiments and applications, at least some keyboard keys and/or pointing device control buttons are provided with Braille indicia or other suitable tactile interface features to facilitate convenient use by blind users. The Braille keys in such embodiments include raised elements that a user may actually sense at his/her fingertips. Within the requirements of the particularly intended application, the keys in such embodiments would be sufficiently large for tactilely distinguishable Braille indicia to be formed thereon. To aid users generally to execute accurate keystrokes, the keys may optionally also be equipped with suitable measures known in the art to illuminate in the dark.

In numerous applications, suitable manufacturing technologies are known in the art which effectively shrink the size of keypads to handheld size, which nonetheless hold legible Braille indicia. Such technologies may be suitably applied to the subject system in various embodiments to form Braille indicia, so that blind users may also accurately distinguish and manipulate the keys during use of the system's pointing device capabilities.

In these and other embodiments and applications, individual keys are preferably sized to be on the order of about 20%-25% of typical keyboard keys in size. The keyboard may or may not be separated into multiple sections depending on the particular embodiment and application, but is nonetheless housed with the given pointing device. To make use of a computer system, for instance, the user may simply to grasp the subject handheld system, insert a flash drive perhaps for suitable configuration of the system, enter any needed keystrokes, then proceed with manipulation of the system's pointing device portion as needed. The user has the ability to actuate the alphanumeric character or other keys on the keyboard portion provided with the pointing device portion to carry out whatever needs to be done on the computer. The user need not struggle, for instance, searching for a flash card connector on the computer's CPU housing, or fussing with other extraneous user interface devices, as the needed user interface devices are co-located right there in the handheld system. This affords such multi-tasking as picking up and answering a phone call on one hand while manipulating the handheld system's integrated user interface devices with the other to control/interact with a laptop or other computer system.

Figure 8:
FIGS. 8-8D are comparative perspective and various plan and elevational schematic views of an isolated exemplary implementation of an audio switch/button component of the embodiment of the system shown in FIG. 1.
Figure 8A:
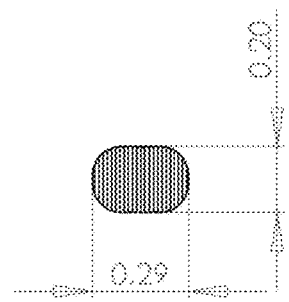
Figure 8B:
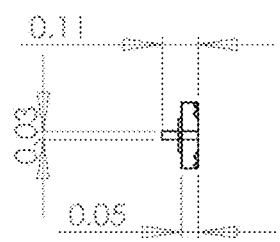
Figure 8C:
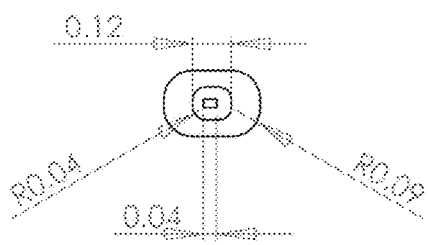

Turning back to use by a blind user, the subject system is preferably equipped with a switch 11 that activates and/or controls an audio component. An example of this is illustrated in FIGS. 1 and 8. Preferably, each time a user clicks on this optional switch, a verbalizing and/or audibilizing function may be turned on or off. So when a key of the keyboard is clicked, like say the key for the letter A, the system in such embodiments verbally announces the letter "A," the audio feedback verifying the key click. So the user knows what key he/she has pressed, and proceeds to interact with the computer system suitably equipped in other necessary respects to meet his/her special interfacing needs. The subject system may thereby supplement existing computer systems that are suitably configured to accommodate users with vision impairment.

For such users with special needs, as well as other users without special needs, disclosed embodiments of the subject system advantageously facilitate in one handheld body/housing continual tactile contact with—and ready access to—a full set of keyboard keys and a mouse and its controls. One need not repeatedly let go then have to reestablish contact with any of these user interface capabilities. The system preferably also provides a convenient connection port(s) for a memory/storage device.

Turning to the accompanying figures, there are schematically shown various views of the subject system formed in accordance with but one exemplary embodiment of the present invention. Certain of the views, such as the overall views of the system and its housing, are illustratively shown in approximately 1:1 scale for a typical application. In other embodiments and applications, the system and its components may be formed with other suitable sizes and relative dimensions, to best suit the intended users. In one illustrative application, though not necessarily all applications, for example, the actual size may be on the order of about 12 centimeters in length. Depending on the needs and preferences of users in a particularly intended application, the size and relative dimensions may be suitably adjusted to minimize the overall system housing size to keep its the pointing device portion easily manipulable, while preserving large enough keys to maintain the ease and accuracy of individual key clicks in its keyboard portion.

Of course, different sizes and/or configurations may be needed to suit different sized hands—for women's hands as compared to men's hands, for adults' hands as compared to children's hands, and so forth. Although some of the views shown in the drawings include dimensional markings and notations, such markings and notations are included purely for illustrative purposes to indicate sample dimensions and dimensional relationships, and the system described herein is not limited to such dimensions or dimensional relationships.

In the interests of broadened, perhaps even universal, use by many different individuals, a locking/disabling feature is preferably provided on the system to guard against inadvertent key actuation. For example, if a user with smaller than average hand size were to reach across keys to effect a mouse click, the intervening bank of keys may be locked or disabled for a certain period (or mode) of device use. That is, if the system's housing happens to be sized and configured to fit a user's hand well, there may be little need to deactivate any keys during pointing device operation. But if the system's housing does not fit as well, a user might accidentally actuate some keyboard keys during operation of the pointing device portion, with for instance the base of his/her palm. Deactivating one or a set of such potentially interfering keys may be preferable in that case. It may be good standard practice, in fact, for such potentially interfering keys to be temporarily disabled in that manner to safeguard against accidental keystrokes, regardless of user.

The subject system is ideally formed with its ergonomic properties optimized for the particularly intended application (and intended user(s)). While the system offers the convenience of having just about every user input measure provided in or within immediate reach of one's hand, the compact nature of the combined arrangement tends to require added (or at least atypical) dexterity. Yet, even with some requisite level of dexterity, the system would in most, if not all, cases provide a more preferable alternative to letting go of one device to handle another, perhaps having to move the limbs while repositioning and turning the body to reach various separate and discrete devices for making different types of user entries.

Preserving the ergonomics of the system lessens the potential inconvenience of any heightened requirement for hand-finger dexterity to operate the system properly. One ergonomic aspect is preservation of a conventional shape for the mouse pointing device portion which users may be highly familiar with, and which they may have grown quite accustomed to. Widely used types of mouse devices are shaped with a curved upper surface that is gradually and bulbously contoured and sized to tuck underneath the palm of an average individual's cupped hand in naturally conformed manner. In the illustrated embodiment, the system's housing takes on this familiar overall shape generally. However, different sections of keys are provided on/through its housing, preferably with different key sections separated by a midpoint near the apex of the system housing, which generally forms a raised midpoint.

The resulting shape and structural configuration are reminiscent of a sleek roll bar on a sports car body—where a thin section of frame extends over and around an intermediate portion of the housing/body, and provides a stable point of structural support. Such roll bar-, or roll cage-like intermediate structure 14a is raised, such that it preferably defines substantially the highest point of the system body/housing or frame, giving the same a generally humped upper profile. This structure also serves as a spacer or separator between forward and rear keyboard sections. The forward keyboard section in the illustrated embodiment is accessed with one's fingers while portions of the gripping hand underneath the knuckles between the base of the fingers and inside palm rest on or hover over the mid portion of the housing for ergonomically accommodating support (depending on the reach of the user's fingers and the particular keys being struck). This effectively forms a hand rest support and divider structure, especially when the user is reaching past the forward keyboard section to manipulate and click the buttons of the pointer device disposed even further forward on the system's housing. When the user is activating certain closer keys at the forward keyboard section, the palm naturally rises up and hovers over the support/divider structure and/or the rear keyboard section.

The handheld system is preferably sized and configured, however, such that the base of the device-gripping hand (where it meets the wrist) is kept from pressing down on any keys during use. The system is preferably also sized and configured such that when the user is activating the keys at the rear keyboard section, this base portion of the gripping hand may be placed past the rearmost edge of the system housing to remain resting on the support surface immediately behind the housing.

Referring to FIGS. 1-5B, during operation of the system as a mouse (utilizing its pointing device portion), the user may hold the housing while resting the fingertips on one or more temporarily disabled keys (typically those keys at and/or near the front part of the mouse). A user with an average sized adult hand holding the housing with a slanted frame, would be able to rest his/her lower mid-part of the palm on the raised mid portion 14a. The front/forward section of keys in the illustrated embodiment extend forward from the mid portion of the mouse in a low, generally flat profile inclined or curved slightly downward, so that the keys in that front section remain largely underneath and out of the way of the user's fingers extending overhead. The mid portion 14a provides a support shelf for the midpoint of the user's cupped hand.

As shown, the keyboard portion in the illustrated embodiment is divided into forward and rear sections 16a and 16b. When one is holding the mouse in a forwardly-directed orientation with the front being where the mouse roller and the front tab buttons are disposed, the rear set of keys 16b are positioned under the palm, and the fingers extend forward to bridge over the front set of keys 16a. To actuate the keys of the rear section 16b, the user would slide the hand back relative to the mouse. That is, the user would shift the hand back, then hold the device for instance between the outer finger(s) and thumb while activating the keys with perhaps the index and/or middle fingers. Preferably, the typically less used keys are disposed in the rear section 16b.

In certain embodiments, such as illustrated in FIGS. 24 and 24A-24C, a removable cover/shield member 20 may be employed to temporarily cover portions of one or more key sections to prevent unintended actuation. One example of such shield member 20 is illustrated in the FIGS., pivotally coupled to the housing for angular displacement between forward and rear covering positions (over different keyboard section keys) by a plurality of pivot members 22a, 22b. The pivot members 22a, 22b may be formed by a screw or other suitable mechanism known in the art by which the shield member 20 may be hingedly seated for angular displacement thereabout. The shield member 20 may be formed as a suitably shaped transparent shield for instance and hinged by the pivot members 22a, 22b on either side. When one chooses to use the front section of keys 16a, the shield member 20 may be flipped over to cover at least a portion of the rear section 16b, and vice versa.

The cover/shield member 20 may be formed as a planar or arcuate surface to blend with the mouse housing, or may be formed with other suitable structures such as a protective grill or cage-like bar(s). The cover/shield member 20 need not cover all of the given key section, as long as it covers enough of the section to shield or bar the section from unintended intrusion by any part of the user's fingers/hand. In an alternate embodiment, a slide cover (or shield) member may be incorporated to slidably displace (instead of pivotally) to adjustably cover selected portions of the rear and front keyboard sections 16a and 16b.

To keep the user's palm from touching the protected (shielded/barred) section's keys, or if the user is not ready to use that section, the shield member 20 may be situated over that section. Then, when the user is ready to use the section, he/she may flip the shield member 20 out of the way so it pivots and extends protectively over the other section while revealing the previously protected section for open access. In this way, the shield member 20 may be flipped between its alternate positions in much the manner a motorcycle helmet face shield is flipped between its protective covering and open positions.

As noted, such cover/shield member 20 may alternatively be coupled slidably (or otherwise in otherwise linearly movable manner) to an appropriately contoured track or groove, such that it slides between its alternate positions over the respective key sections 16a, 16b. The added surface area of the cover/shield member afforded in such embodiment may also augment the stability and comfort of surface support for the user's hand during use. Typically, it would matter more in this regard that the shield member 20 fit neatly when positioned over the rear section 16b, for it would then provide a flat smooth surface for more of the palm, offering greater range of comfortable hand movement around and over the mouse.

When access to the covered section of keys is needed, the user may simply slide his/her hand back and re-position the cover/shield member 20 forward. Preferably, the user may simply tilt the member 20 forward such that it easily pivots out of the way. Facilitating this operation would be the mid portion 14a being raised in configuration to define an apex, the highest point of the device housing. The cover/shield member 20 may be formed in certain corresponding embodiments with a convex, substantially U-shaped transverse contour to laterally bridge the device housing, and facilitate interference-free movement in re-positioning between the forward and rear key sections 16a, 16b. The cover/shield member 20 may be formed of any suitable material known in the art, such as for example a glass or plastic material.

Figure 21:
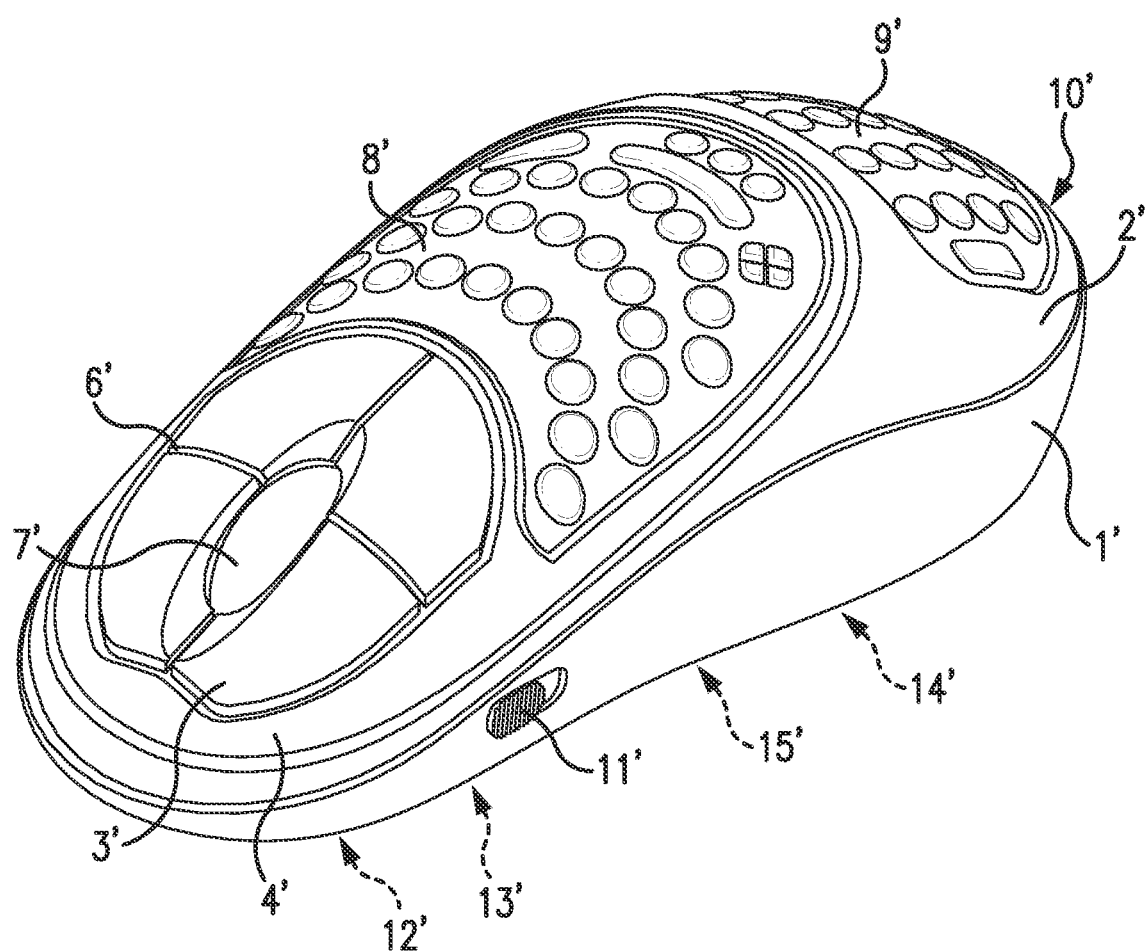
FIG. 21 is a schematic perspective view of the embodiment of the system shown in FIG. 1.

Referring to FIG. 21 and Table 1 below which corresponds thereto, different parts of the subject system 1 may be formed of any suitable materials known in the art, depending on the requirements of the particularly intended application. Examples of the various material compositions preferably employed for certain of the device's parts are reflected in the table shown in page 26 of the FIGS. As indicated therein, certain parts are formed of such materials as injection molded plastic, rubber, and the like. Certain components like electronic circuits are typically obtained in a prefabricated form known in the art and incorporated as such. The parts and components of system 1 may be formed with other suitable material compositions and other prefabricated configurations known in the art, as required by the particularly intended embodiment and application.

TABLE 1

| ITEM NO. | PART NUMBER | DESCRIPTION | QTY. |
| --- | --- | --- | --- |
| 1' | SW3dPS-Cordless Mouse bottom half | injection molded plastic | 1 |
| 2' | SW3dPS-Cordless Mouse top half | injection molded plastic | 1 |
| 3' | SW3dPS-Cordless Mouse buttons | injection molded plastic | 1 |
| 4' | SW3dPS-Cordless Mouse button cap | injection molded plastic | 1 |
| 6' | SW3dPS-Cordless Mouse right side button | injection molded plastic | 1 |
| 7' | SW3dPS-Cordless Mouse mouse control wheel | rubber | 1 |
| 8' | main keyboard | injection molded rubber | 1 |
| 9' | numeric keyboard | injection molded rubber | 1 |
| 10' | SW3dPS-SD SOCKET HOUSING | SD card and reader | 1 |
| 11' | button | injection molded plastic | 1 |
| 12' | circuit board | pre fab part | 1 |
| 13' | led | LUMEX EDGE MOUNT LED | 1 |
| 14' | micro processor | pre fab part | 1 |
| 15' | ANT-107 | BLUECHIP INTERNAL WIRELESS DEVICE ANTENNA | 1 |

Figure 22:
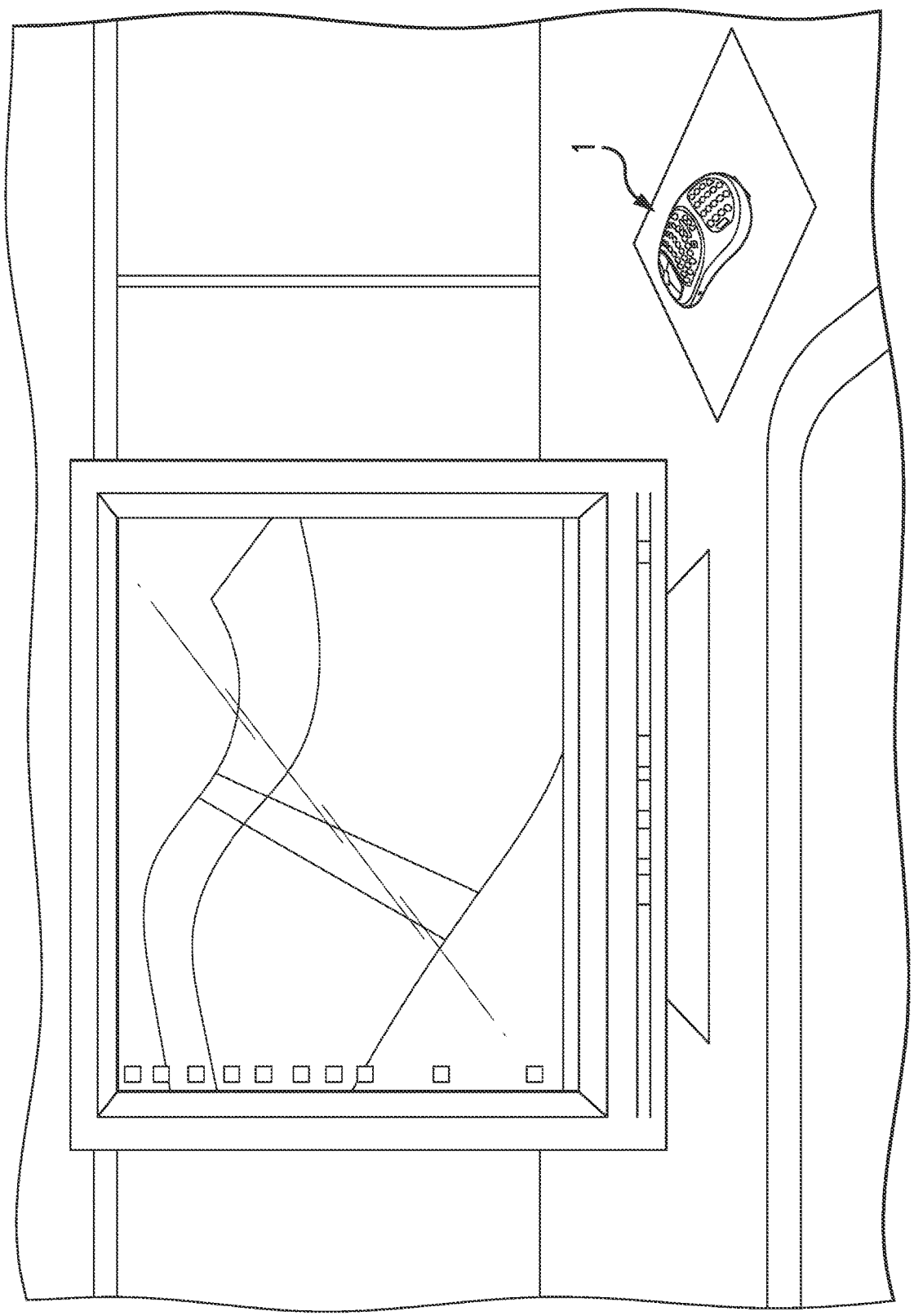
FIG. 22 is a schematic perspective view of the embodiment of the system shown in FIG. 1, illustrating the system during typical use with a host computer system.

FIG. 22 illustrates one example of the system 1 in typical use, where a user is sitting at a computer, laptop, or other host system, he/she may operate the handheld system 1 and its various ergonomically integrated user interface devices with but one hand. So when other ordinary events occur, such as when a phone rings or when other tasks required of the user arise, he/she may do so with a free hand while still working the system 1.

Turning to FIGS. 6-20C, various views of the system 1 overall and illustrative samples of certain parts/components when disassembled from the rest of the system 1 are shown. They illustrate the structural make up and use of the system 1 in one exemplary embodiment. There are numerous other embodiments for implementing the system which incorporate a number of features reflected in the embodiment illustratively shown here.

With reference to these FIGS. as well as FIGS. 1-5C, the device generally includes in the illustrated embodiment a mouse body/base, or housing 10 defining an internal compartment. An upper frame 14 of the housing 10 is provided with an intermediate raised section, or mid portion, 14a extending over the internal compartment. This raised section 14a is structurally configured to serve much like a roll-bar structure on a land vehicle, and defines the highest point of the mouse frame. Mid portion 14a thus serves as an intermediate support base portion, or intermediate support bar structure, on which the user may rest the middle part of the gripping hand while using the system 1.

Other main parts of the system 1 include the keyboard, which is incorporated with other parts that in many other respects take on the suitable known features of a conventional mouse and its control operation in coordination with a given computer or computer-based host system. The system 1 accordingly includes a plurality of mouse buttons 12a, 12b, 12d, 12e—for instance, four buttons in the particular embodiment shown—along with a roller wheel 12c preferably arranged in the midst of the mouse buttons. The system 1 also includes in this particular mouse embodiment an audio activation button 11 disposed discreetly at a side of the housing 10. The audio activation button 11 could be actually disposed at a suitable location elsewhere on the housing 10, depending on the requirements of the particularly intended embodiment and application, but it would be most convenient and remain clear of finger movements being tucked away in locations such as at the side towards the bottom of the mouse housing 10. The button 11 may be actuated to activate a suitable audio conversion (audibilizing) feature incorporated in the housing 10 or within its internal compartment.

Actuation of the audio activation button 11 is operably conveyed through suitable measures known in the art for communication with the given computer system. Preferably, speakers or other audio/multimedia equipment already provided in the computer system are utilized to render the corresponding audio announcement, though in certain other embodiments such audio equipment may also be provided with the other integrated user interface devices of the handheld system 1.

In addition to users with visual impairment as noted, the audio conversion feature may also be helpful for use with children, young children who may not yet read quite well. The feature may be helpful as well for use with older persons who may have difficulty seeing small keys, by offering audible confirmation of the keys that they hit.

The keyboard keys in the illustrated embodiment are split into two main sections, the first being the front section 16*a* disposed forward of the intermediate support bar 14*a*, so that when the user actually cups a gripping hand around the body of the mouse portion, the fingers of the hand will tend to naturally 'float' over the front section of keys 16*a*. Preferably though not necessarily, the keys in this front section 16*a* include the most oft-pressed keys such as the alphabetic character keys; space bar key; enter/return key; the control, alt, delete, and insert keys; the up, down, and side arrow keys; and the like.

For convenience, one or more of the mouse click buttons may be programmably configured to operate also as a keyboard key when needed. For example, a right click button of the mouse may be converted for certain applications to double as an enter key or return key. That may provide a shortcut option over reaching back to a separately designated key. Other mouse buttons may be similarly converted or reserved for dual operation in this regard as other often pressed keyboard keys, such as tab, backspace, or delete keys.

The device in the illustrated embodiment preferably also includes one or more ports 18 for interconnection of a memory card or other such external data storage media to the given computer system. The device preferably includes interface measures containing suitable driver software to access and read the interconnected storage media, and may preferably be compatible with various common types of portable memory devices such as for example an SD card 17. A port 18 is disposed within a pocket or recess formed in the housing 10. As detailed in following paragraphs, the port receives insert of a suitable storage device 17 that is inserted then clicked therein for operational interconnection to the given computer system.

Figure 11A:
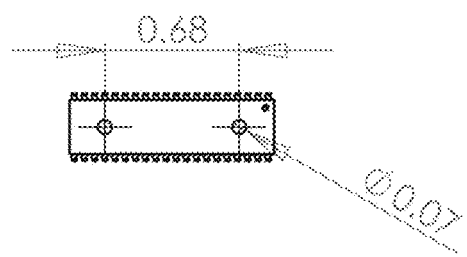
FIGS. 11-11C are comparative perspective and various plan and elevational schematic views of an isolated exemplary implementation of a microprocessor component for storage media port data interface in the embodiment of the system shown in FIG. 1.
Figure 11:
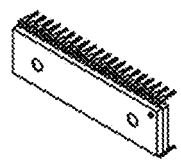
Figure 11B:
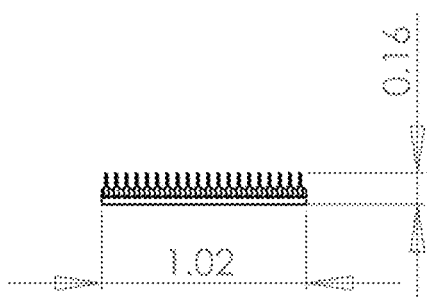
Figure 11C:
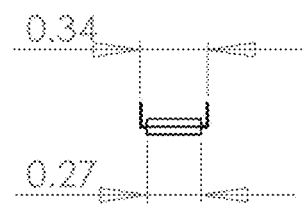

The data interface measures for the storage media port 18 include a programmable microprocessor-based processor component such as for example an integrated circuit chip illustrated in FIGS. 11-11C disposed towards a bottom of the housing 10. So when one opens up the mouse housing 10, at the bottom of it is where a reader for the interconnected SD card is preferably disposed (effectively formed by the port 18 and the accompanying interface processor). A connection between the storage media and the given computer is operationally made by the processor which is preconfigured to execute suitable software to generally control the memory card reader, so as to access and read/write the storage contents in a suitably compatible manner with the host computer system's controller operation.

Figure 19A:
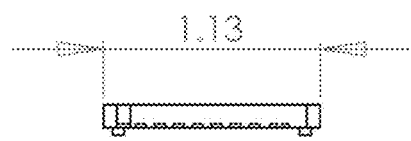
FIGS. 19-19D are comparative perspective, bottom plan, front elevational, side elevational, and top plan schematic views of an isolated exemplary implementation of a storage media port of the embodiment of the system shown in FIG. 1.
Figure 19:
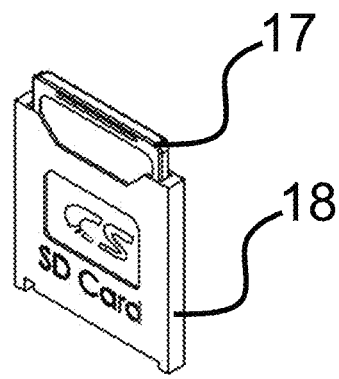
Figure 19B:
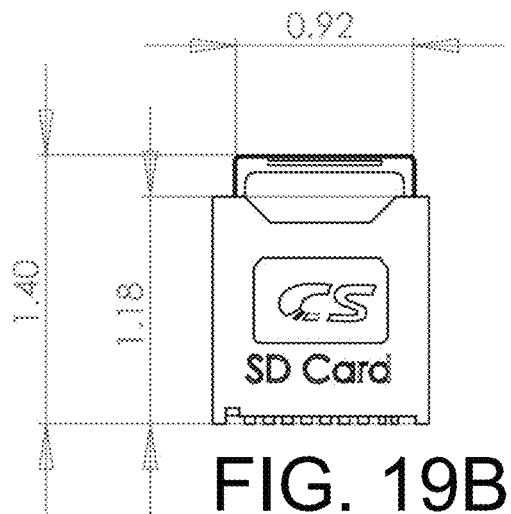
Figure 19C:
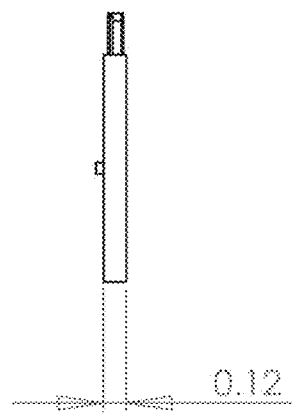
Figure 19D:
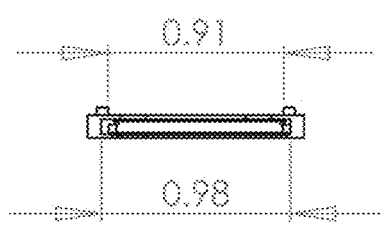

Turning to FIGS. 19-19D, there is schematically shown one exemplary embodiment an SD card port 18 of a suitable type known in the art. The SD card port 18 is disposed within the system's housing 10 and interconnected to the data interface measures provided therein. If required for certain applications, the SD card port 18 may accommodate an adapter 'shield' (or sleeve) for operable insertion of a micro SD card into the same card port, though the micro SD card is of smaller size and configuration than a standard SD card 17 illustrated.

Figure 20:
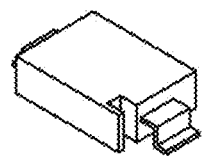
FIGS. 20-20C are comparative perspective and various plan and elevational schematic views of an isolated exemplary implementation of a wireless antenna component of the embodiment of the system shown in FIG. 1.
Figure 20A:
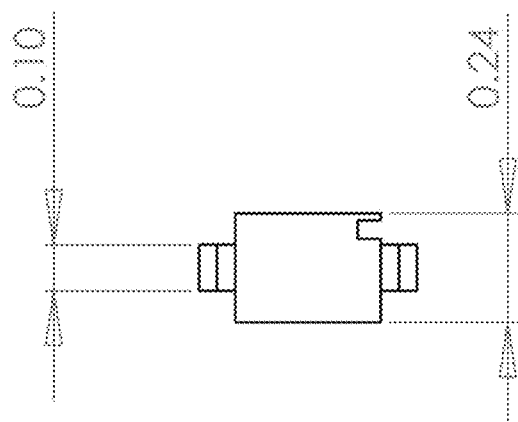
Figure 20B:
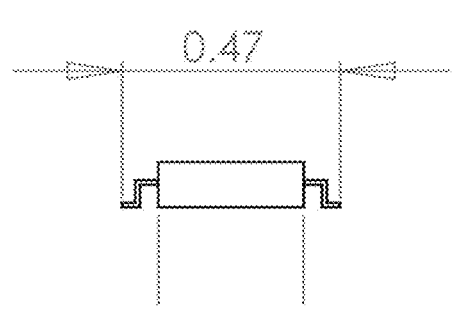
Figure 20C:
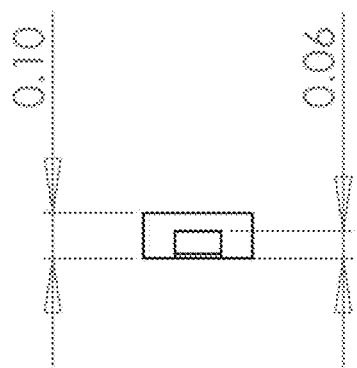

The storage media reader provided in this manner reads the information on the SD card 17, converts the same to a form for transmission to the given host computer system over a suitable communications link. The link in this example is preferably though not necessarily a wireless link. The handheld system 1 preferably includes a wireless antenna device such as schematically illustrated in FIGS. 20-20C. This may be implemented by a conventional antenna that allows for wireless connection via a so-called 'dongle' or other such wireless receiver coupled for instance to the host computer system via a conventional USB port. Suitable measures known in the art are provided in this regard to load the software implemented drivers needed for bidirectional communication with the host computer's operating system. The communication link may be either wired or wireless, depending on the requirements of the particularly intended application.

Figure 4:
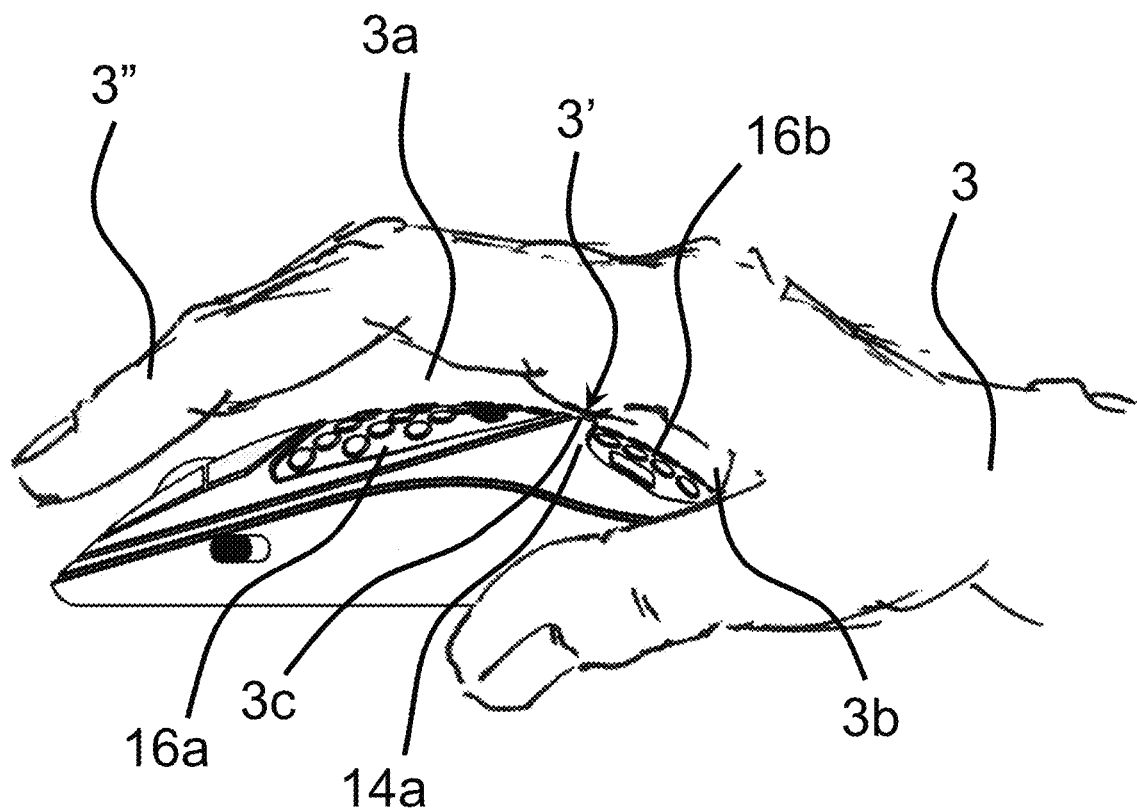
FIG. 4 is a schematic left side elevational view of the embodiment of the system shown in FIG. 1, illustrating a user's gripping the system during typical use.
Figure 5A:
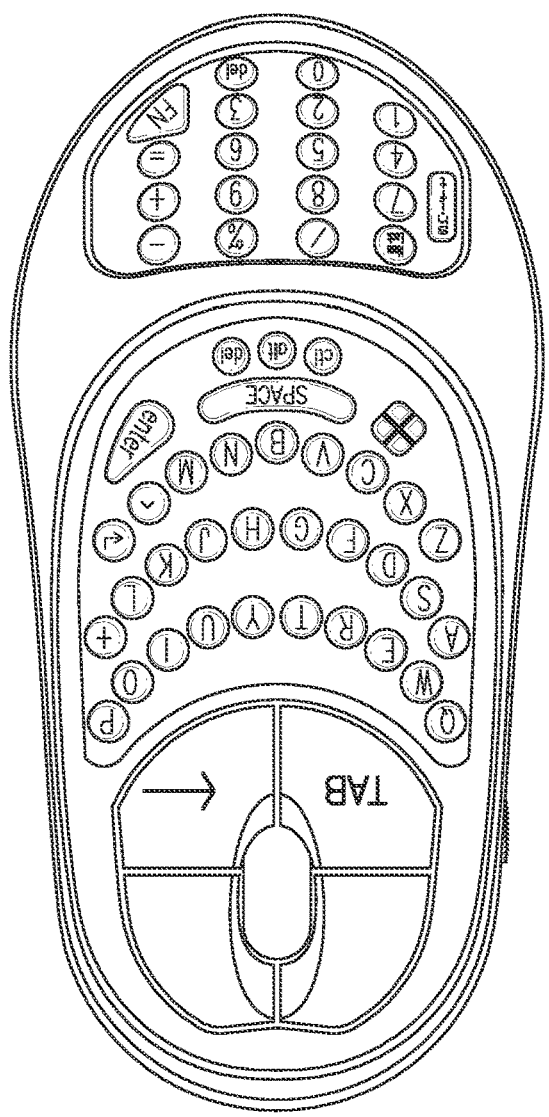
FIGS. 5A-5B are comparative top plan and front elevational schematic views of the embodiment of the system shown in FIG. 1.
Figure 5B:
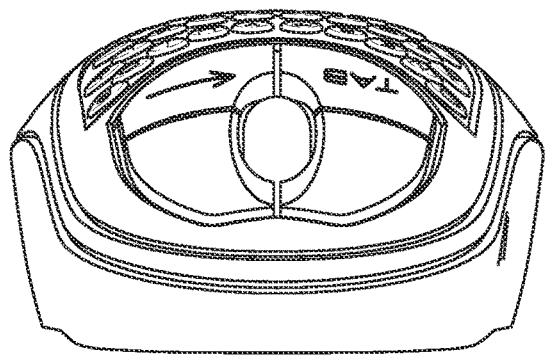
Figure 6A:
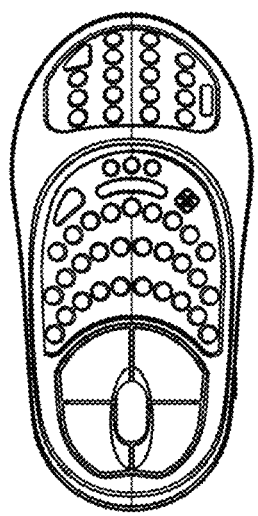
FIGS. 6-6D are comparative perspective, top plan, front elevational, side elevational, and bottom plan schematic views of the embodiment of the system shown in FIG. 1.
Figure 6B:
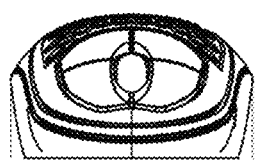
Figure 6:
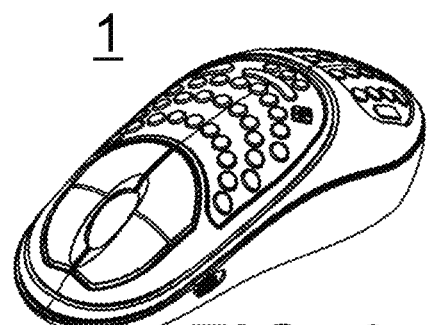
Figure 6C:
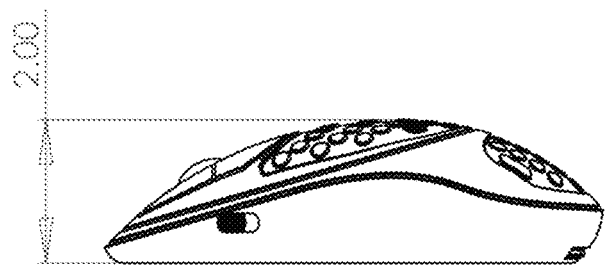
Figure 6D:
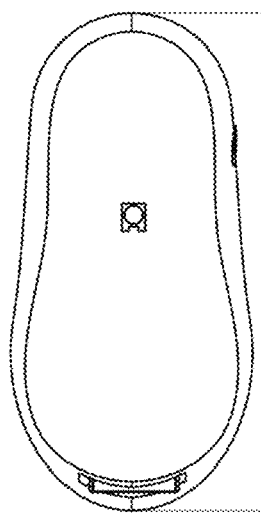

Referring to FIGS. 4 and 6-6D, there are shown various views of the handheld system 1, including top, bottom, side elevation, and front perspective views. In the side elevation view of FIG. 4, a gripping hand 3 of user is shown for purposes of illustration. The mouse portion of the system housing 10 is ideally sized and configured to suit this particular user's right hand 3 in the example shown. As illustrated, the inside knuckles where the palm meets the base of the fingers, or region 3', of the hand rests on the intermediate support bar 14*a* of the mouse housing 10. The user may thereby rest his/her hand 3 on the intermediate support bar 14*a*, and wrap the hand around it with for instance the thumb extending to one side and pinky on the other. The index finger 3" (as well as the middle and ring fingers) is then free to access the mouse buttons as well as to access the various keys at the front, or forward, keyboard section 16*a*.

Note that the portion(s) marked 3*c* represent the point(s) of contact between the region 3' of the hand and the intermediate support bar 14*a* of the device (along its lateral length). The portion marked 3*a* shows the gap, or space, underneath the midsections of the fingers 3", as a user will typically touch the keys of section 16*a* with the tips of his/her fingers 3". Consequently, the fingers 3" tend to bridge over the forward keyboard section 16*a* and stretch out as illustrated in the figure. Preferably, the system 1 is configured such that space remains between the midsection of the fingers and the keys section 16*a* even during key depression, whereby the user is not prone to making unintended contact with the keys even then. When one holds the mouse portion of the system 1, it is typically as shown—with the index and other intermediate fingers 3" slightly bending to form a natural arch to bridge over the intervening keys 16*a* underneath.

The keys of both keyboard sections 16*a*, 16*b* are comparable in size to those typically found in virtual keyboards of smart telephone devices (or even on physical keyboards of personal communication or other devices). With the prevalence of such devices, most users would have gained extensive practice using keyboards of such size and compact arrangement of keys. Hence, many users will be adept at typing on them with high degree of proficiency. Actuating individual keys of the system 1 should be not be appreciably different in terms of accuracy and speed, for instance, than actuating the individual virtual keys provided on smart phone screens.

The added advantage with physical keys as opposed to virtual keys is the tactile feedback provided when one hits a key true. There may also be a discernible sound of a keystroke to provide audio feedback of a true hit. That distinct tactile feedback of actually touching a key instead of just a smooth flat surface, coupled with the distinctive clicking of an actual keystroke, should only help to heighten both accuracy and speed of typing.

The region under the user's hand marked 3b in the diagrammed view is where the actual palm (not the fingers) under the cupped part of the hand 3 is naturally raised above the rear key section 16b when typing. Accidental keystrokes at this key section 16b are thereby avoided. That is preferably reinforced by other safeguards disclosed herein, such as key deactivation measures or the cover/shield member to physically bar encroachment of a key section, help the user all the more to keep from inadvertently hitting extraneous keys.

Figure 8D:
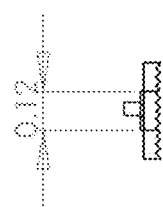

The views in FIGS. 7-7D schematically illustrate one exemplary implementation of a base part 10a of the mouse housing 10 disassembled from other parts. The storage media port 18 is shown disposed inside the housing part 10a. Also shown in the side elevation view of FIG. 7C is a conversion button 11 suitably provided for selective actuation of the audio announcement feature for individual keystrokes. FIGS. 8-8D illustrate one exemplary implementation of the audio conversion button 11 in more detail. The button in this embodiment is formed with a ridged surface texture.

As noted, various FIGS. include views of different parts of the system 1 isolated for purposes of clear illustration from other parts of the system. The different parts are suitably assembled together and interconnected to form the embodiment shown. Those skilled in the art will readily recognize that certain parts and their functions are not shown so as not to obscure parts and features illustrated herein but are well known in the art, and therefore not described in detail herein for that reason.

Figure 10A:
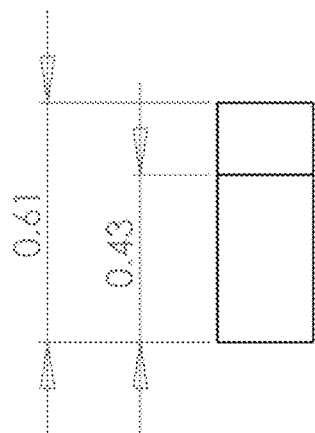
FIGS. 10-10D are comparative perspective and various plan and elevational schematic views of an isolated exemplary implementation of an LED sensor component for the pointing device portion in the embodiment of the system shown in FIG. 1.
Figure 10:
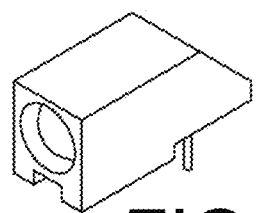
Figure 10B:
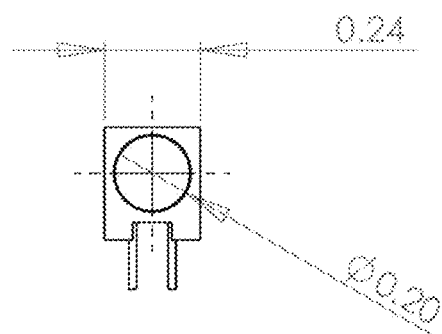
Figure 10C:
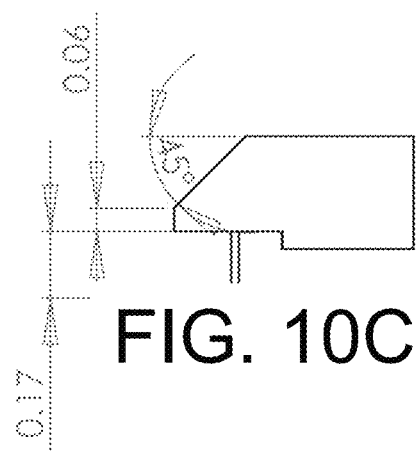
Figure 10D:
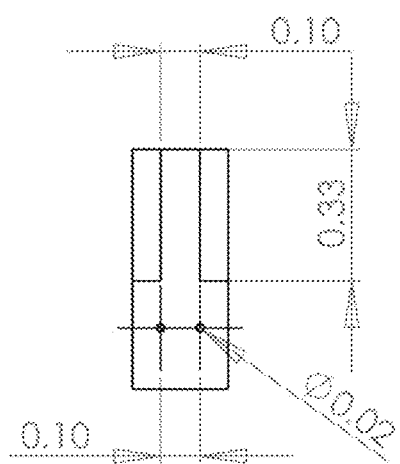

FIGS. 9-9C schematically illustrate a one exemplary implementation of a bottom panel of the mouse housing's base part 10a, through which an opening or window is formed to accommodate a positional tracking sensor of the mouse portion. A positional tracking sensor may be implemented for example by such suitable measures known in the art as an infrared LED or other position sensor and transmitter (or transceiver) component for transceiving a sensing signal through the opening/window. Such components operates to sense/detect mouse displacement and transmit the sensing signals to the mouse interface receiver (such as a dongle) provided on the host computer system. One example of an infrared LED component provided in the system 10, which detects mouse displacement optically and transmits corresponding signals to the given mouse interface receiver via infrared (or other predetermined electromagnetic) communication link is illustrated in FIGS. 10-10D. In certain embodiments (not shown), where the particularly intended application permits or requires, the integrated user interface device may be coupled alternatively via other wired or wireless communication links.

Figure 12A:
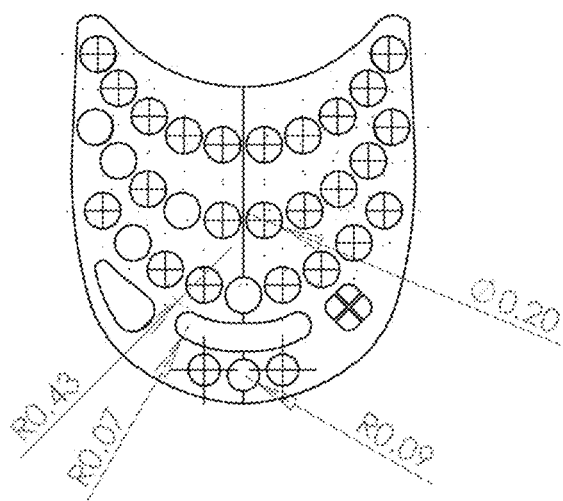
FIGS. 12-12D are comparative perspective, bottom plan, front elevational, side elevational, and top plan schematic views of an isolated front keyboard section of the embodiment of the system shown in FIG. 1.
Figure 12:
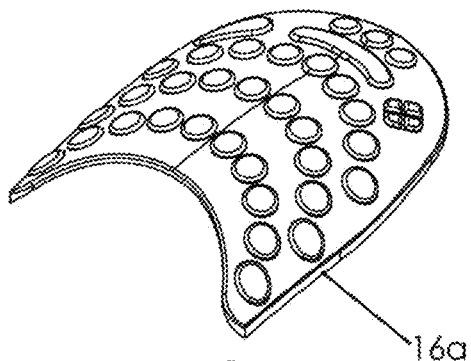
Figure 12B:
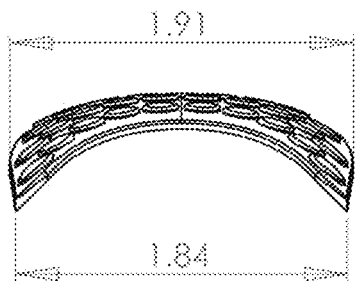
Figure 12C:
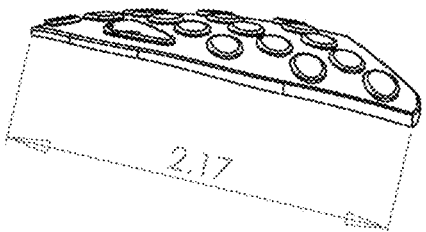
Figure 12D:
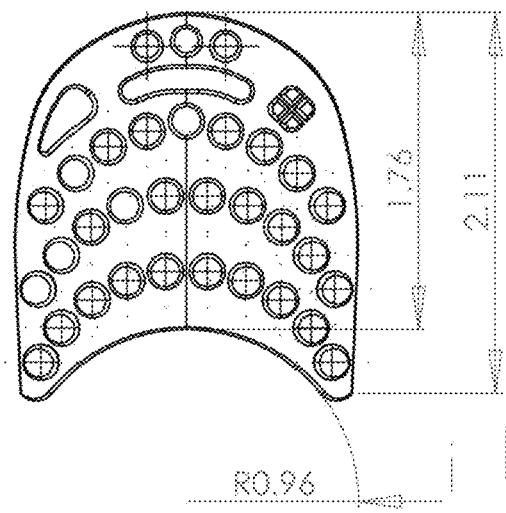

Turning to FIGS. 12-12D, various views of the upper layer of the forward keyboard section 16a are illustrated in isolation. In the disclosed embodiment, this forward keyboard section 16a is formed with a flexible membrane-like structure having individually displaceable (or deflectable) keys. The key section is formed with a membrane-like shield or plate on which the actual individual keys are provided for selective manual depression. The keys are each preferably equipped with a suitable support mechanism known in the art that is resilient or otherwise displaceable in upwardly biased manner, such that when sufficiently pressed it makes actuating interconnection, then returns to its original position when released.

Figure 13A:
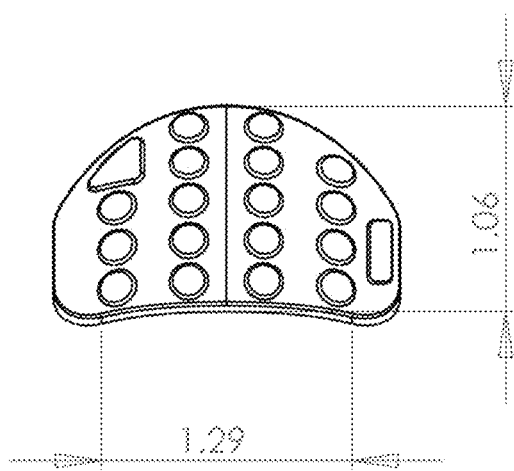
FIGS. 13-13D are comparative perspective, bottom plan, front elevational, side elevational, and top plan schematic views of an isolated rear keyboard section of the embodiment of the system shown in FIG. 1.
Figure 13:
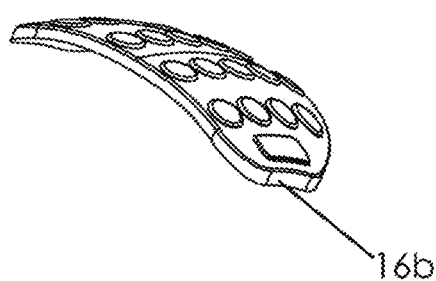
Figure 13B:
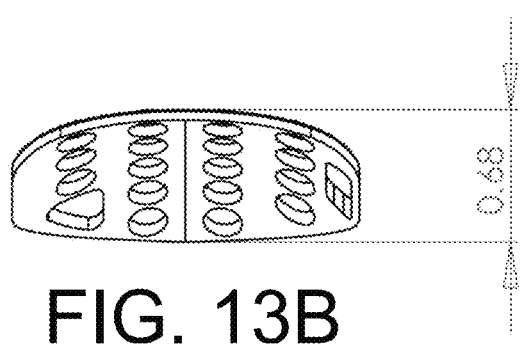
Figure 13C:
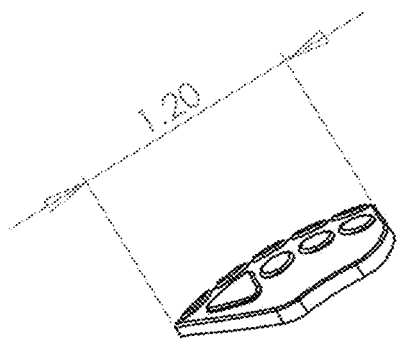
Figure 13D:
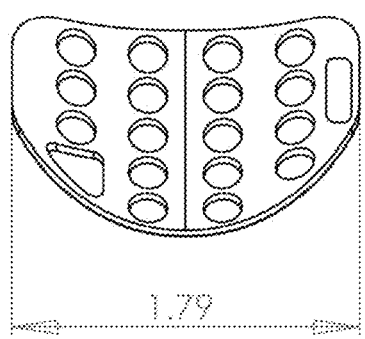
Figure 14A:
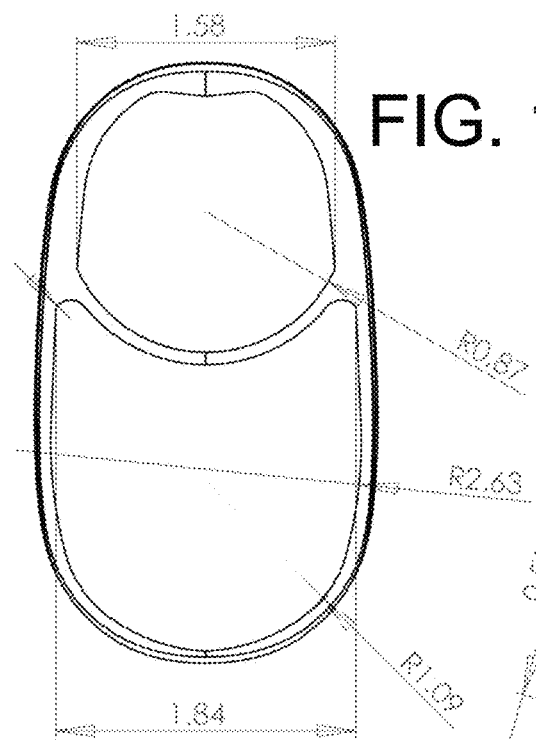
FIGS. 14-14D are comparative perspective, bottom plan, front elevational, side elevational, and top plan schematic views of an isolated part of the upper frame of the housing in the embodiment of the system shown in FIG. 1.
Figure 14:
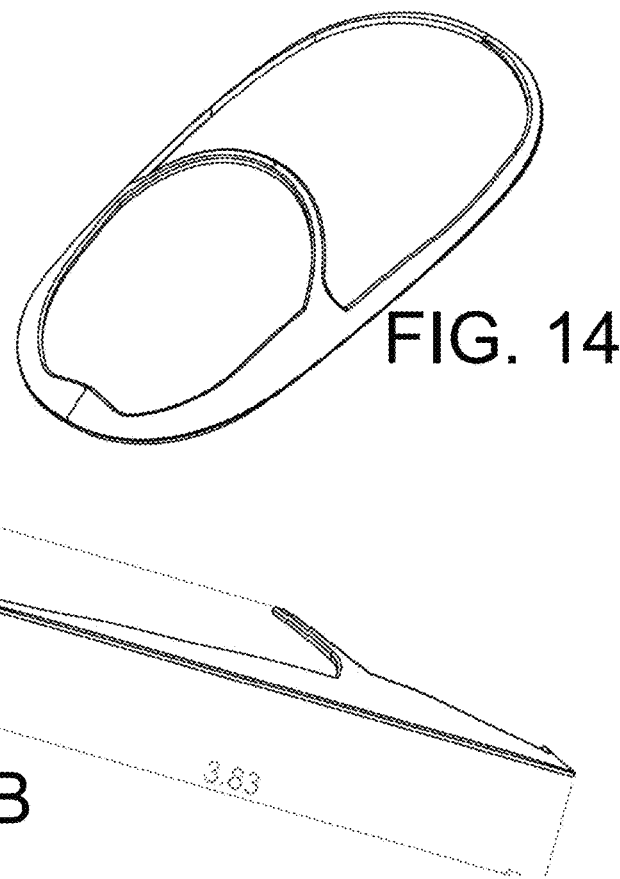
Figure 14B:
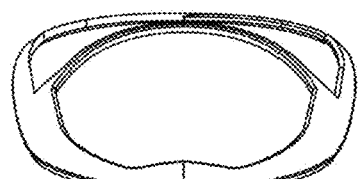
Figure 14C:
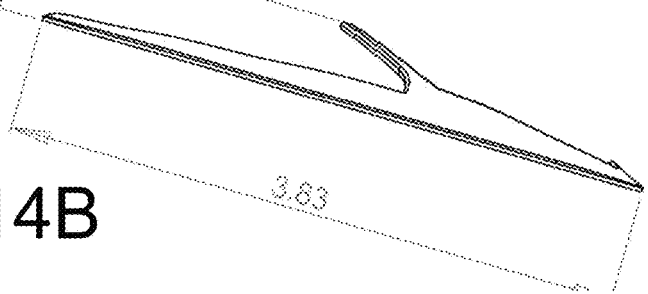
Figure 14D:
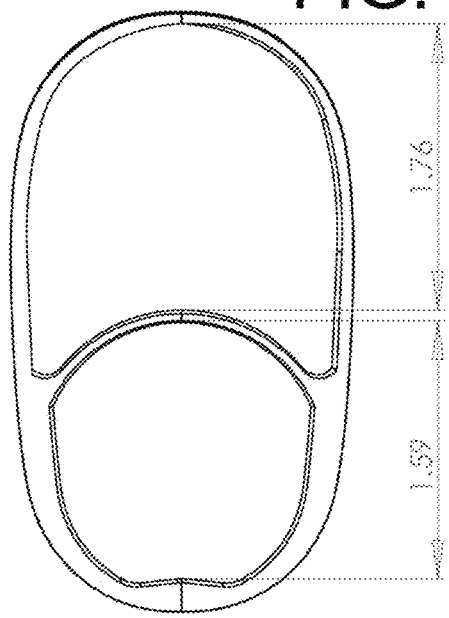

FIGS. 13-13D include various views of the upper layer of the rear keyboard section 16b illustrated in isolation. In the disclosed embodiment, this rear keyboard section 16b is also formed with a membrane-like structure having individually displaceable (or deflectable) keys which are supported in upwardly biased manner, much as the forward keyboard section 16a is.

FIGS. 14-14D and 18-18C include various views of the parts which nest together to form the upper frame 14 of the system housing 10 illustrated in isolation. The upper frame 14 in this exemplary implementation generally forms a skeletal frame structure which couples to the base part 10a to form the housing 10. The upper frame 14 defines the structural members surrounding the spaces for receiving the mouse control buttons and wheel 12a-12e, as well as the different keyboard sections 16a, 16b. The skeletal frame structure also defines the intermediate support portion 14a, which protrudes upward to at least partially be raised above surrounding peripheral portions of the skeletal frame structure.

Figure 1D:
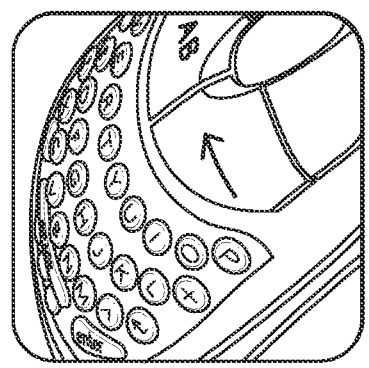
FIGS. 1A-1D are various partially cut away views of the embodiment of the system shown in FIG. 1.
Figure 1C:
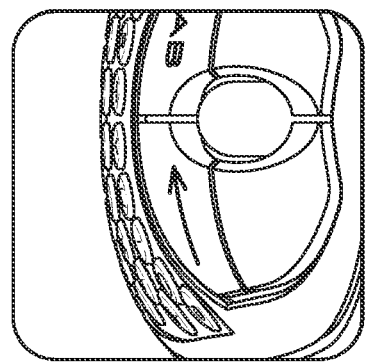
Figure 1B:
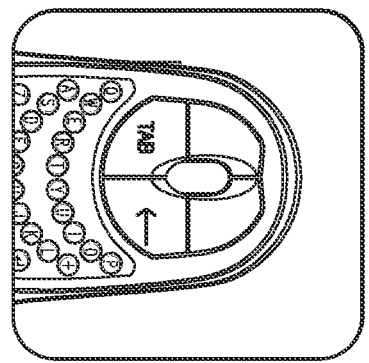
Figure 1A:
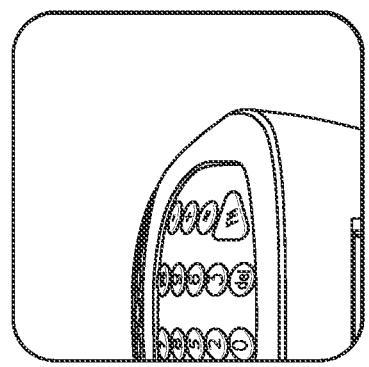
Figure 2:
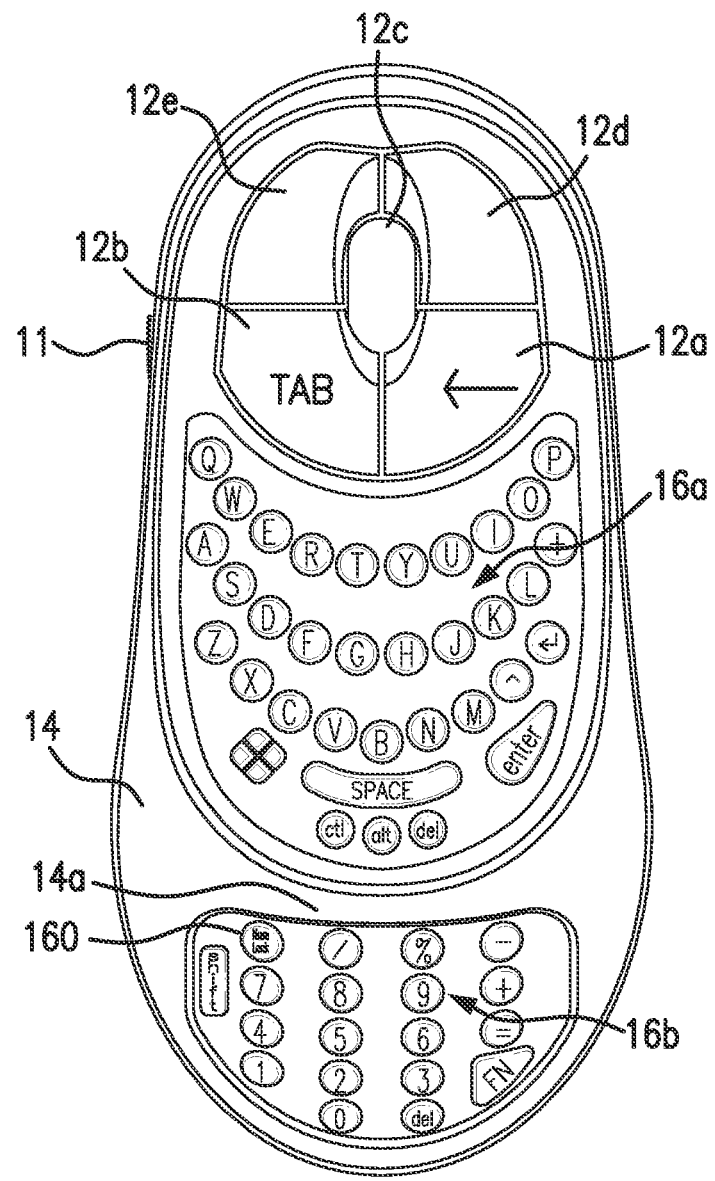
FIG. 2 is a top plan view of the embodiment of the system shown in FIG. 1.
Figure 3:
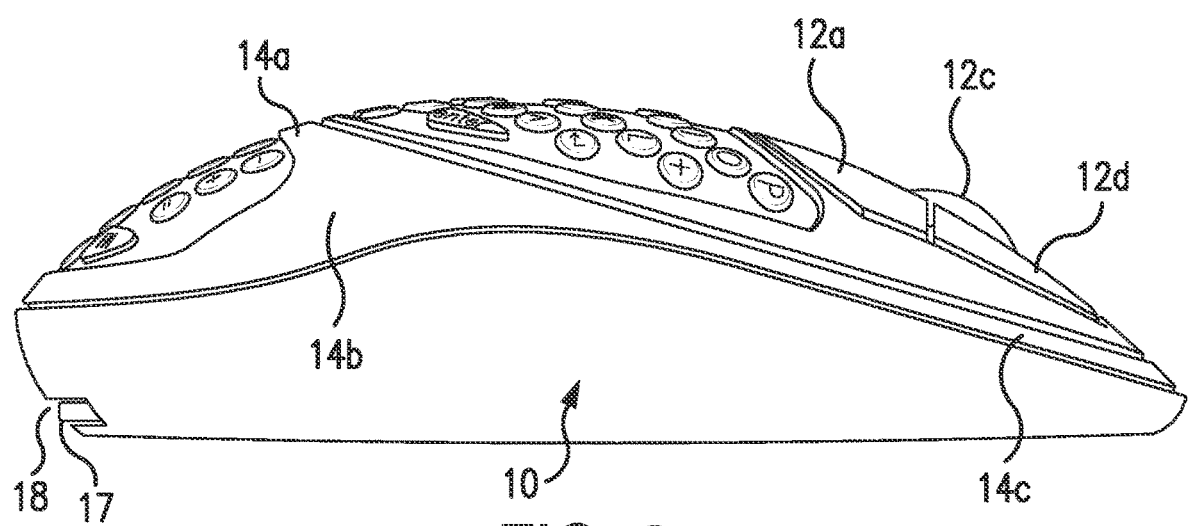
FIG. 3 is a right side elevational view of the embodiment of the system shown in FIG. 1.
Figure 15A:
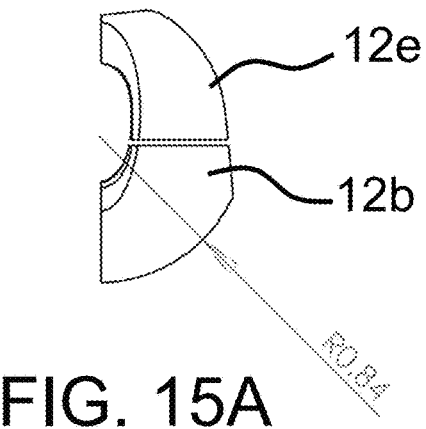
FIGS. 15-15D are comparative perspective, bottom plan, front elevational, side elevational, and top plan schematic views of isolated left mouse control buttons of the embodiment of the system shown in FIG. 1.
Figure 15:
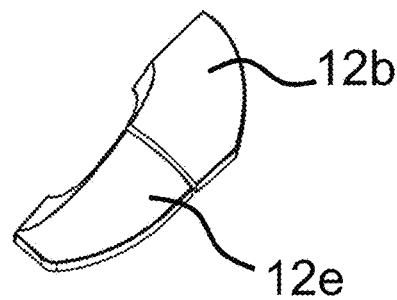
Figure 15B:
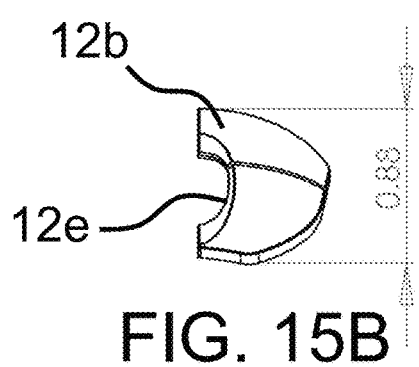
Figure 15C:
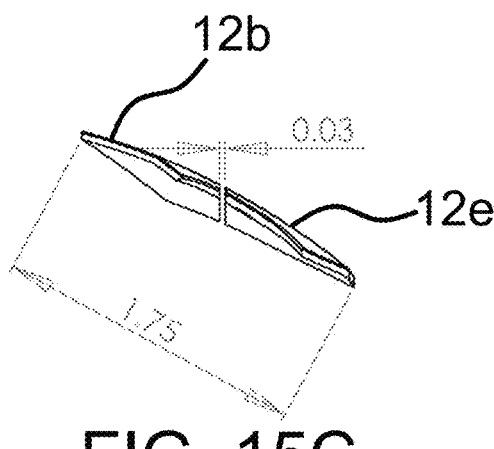
Figure 15D:
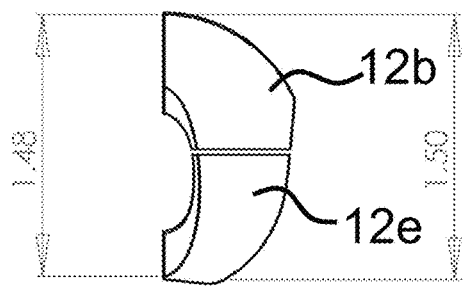
Figure 16A:
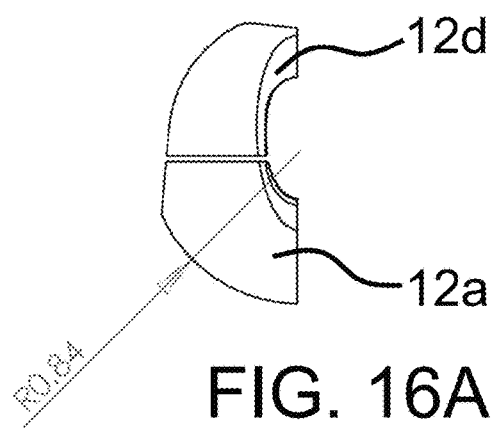
FIGS. 16-16D are comparative perspective, bottom plan, front elevational, side elevational, and top plan schematic views of isolated right mouse control buttons of the embodiment of the system shown in FIG. 1.
Figure 16:
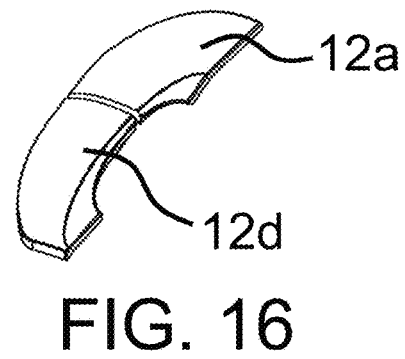
Figure 16B:
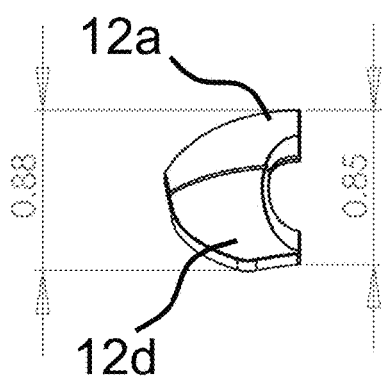
Figure 16C:
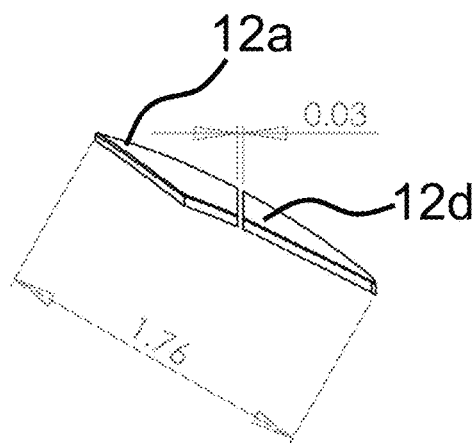
Figure 16D:
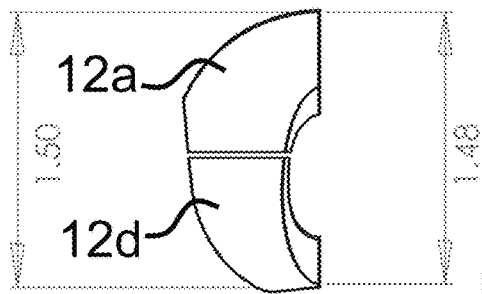
Figure 17:
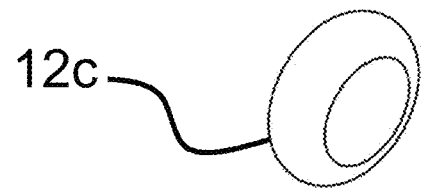
FIGS. 17-17B are comparative perspective and various plan and elevational schematic views of an isolated mouse control wheel of the embodiment of the system shown in FIG. 1.
Figures 17A, 17B:
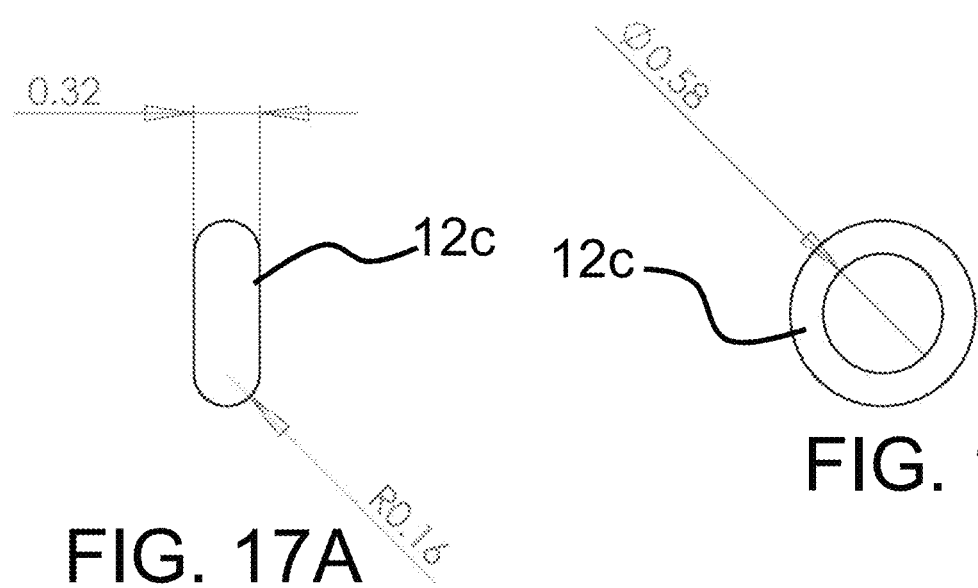
Figure 18A:
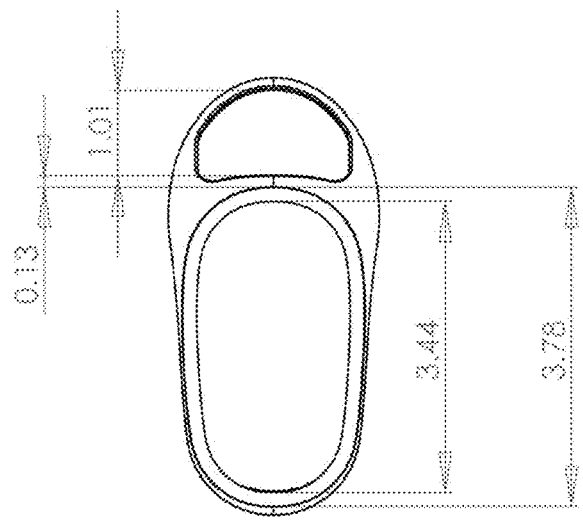
FIGS. 18-18C are comparative perspective, bottom plan, front elevational, side elevational, and top plan schematic views of an isolated part of upper frame of the housing in the embodiment of the system shown in FIG. 1.
Figure 18:
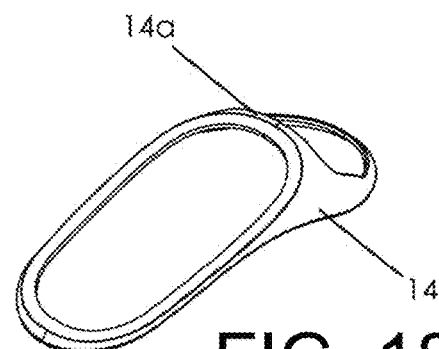
Figure 18B:
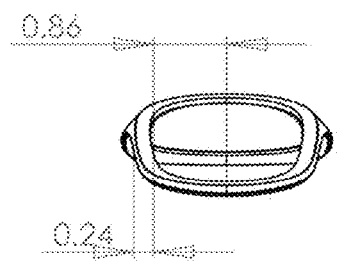
Figure 18C:
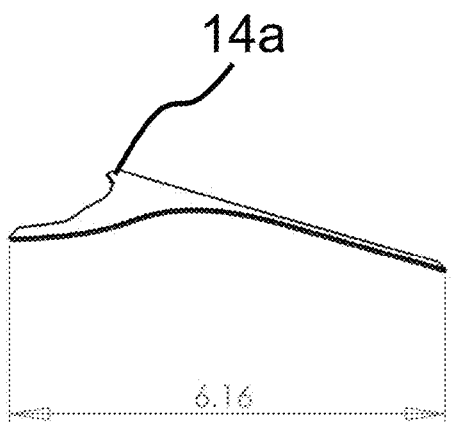

FIGS. 15-15D include various views of the left (12b, 12e) mouse control buttons illustrated in isolation, and FIGS. 16-16D include various views of the right (12a, 12d) mouse control buttons illustrated in isolation. The mouse control wheel 12c is separately illustrated in FIGS. 17-17B. Each of the control buttons 12a, 12b, 12d, 12e is independently depressible when installed in the housing 10 to actuate suitable control functions such as cursor select, menu window open/expand, or the like. Likewise, the mouse control wheel 12c is independently rotatable when installed in the housing 10 to actuate suitable control functions such as screen scrolling or the like. As illustrated in FIGS. 1B-1D and described in preceding paragraphs, one or more of the mouse control buttons may be suitably configured to double as certain keys of the keyboard such as the return or tab, as shown for example.

Figure 23:
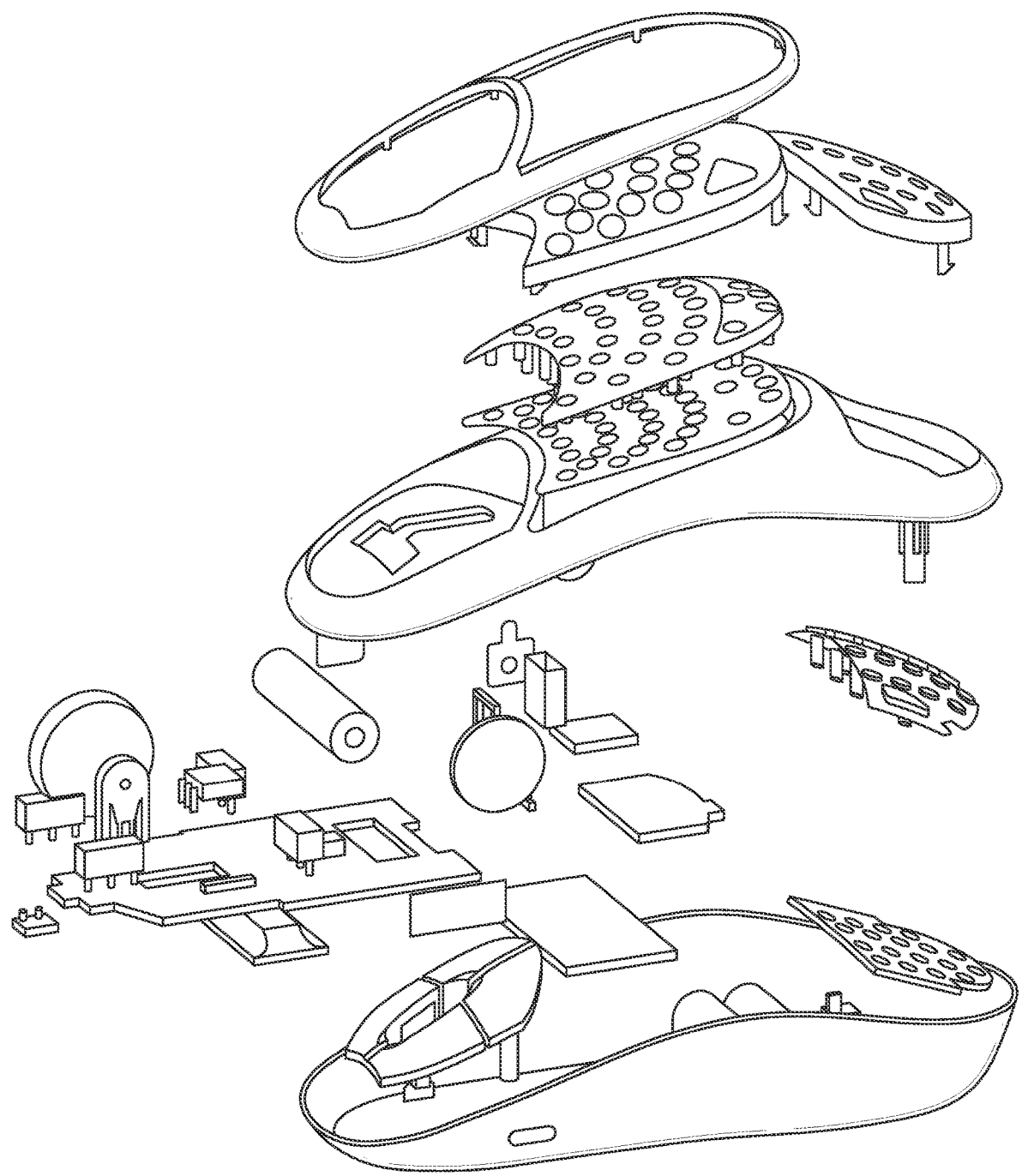
FIG. 23 is an exploded perspective view of the system shown in FIG. 1, as implemented for an exemplary application; and, FIGS. 24-24C are comparative perspective and various plan and elevational schematic views of a system formed in accordance with another exemplary embodiment of the present invention, employing a shield member for selectively covering a portion of a keyboard portion.
Figure 24:
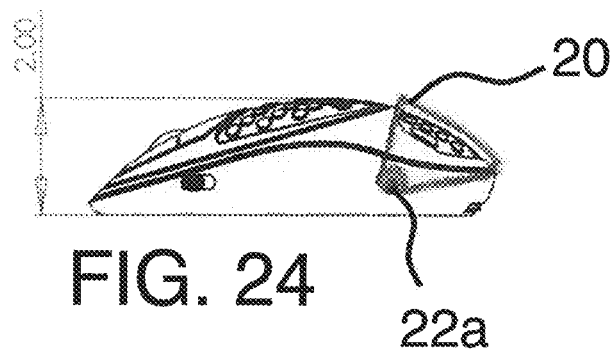
Figure 24A:
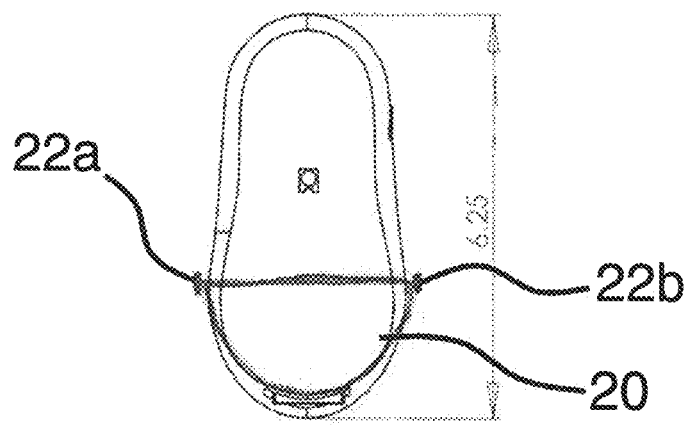
Figure 24B:
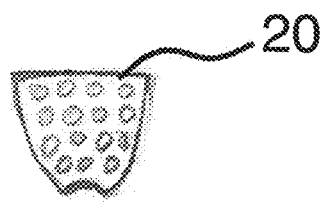
Figure 24C:
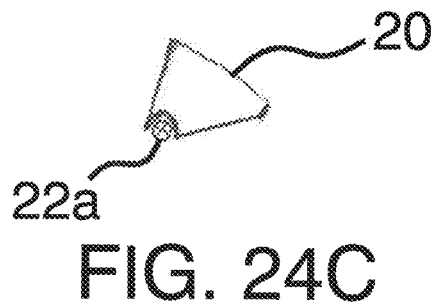

FIG. 23 illustrates an exploded view of the system 1 as implemented for an exemplary application. In this view, certain conventional parts and components of an operational mouse and keyboard are shown, which are not specifically described in preceding paragraphs but readily known to those of skill in the art. These include such parts and components as an onboard battery/power source which may be rechargeable to power the mouse and keyboard operations, a circuit board having suitable circuitry and electronic components to support onboard operations, and the like, which are disposed in/on the housing.

Generally, the following advantages are realized, among others, by use of the subject system 1 having multiple user interface devices ergonomically integrated therein:
  The system's multi-function mouse/keyboard features a full, built-in alphanumeric keyboard and a full-function mouse.
  The mouse portion of the system preferably incorporates conventional left and right-click buttons, center scroll wheel, and USB interface.
  The keyboard portion of the system is situated centrally on/within the mouse portion.

The system preferably includes a detachable transparent plastic cover that guards against accidental keystrokes during use of mouse functions while protecting parts of the keyboard portion from dust, debris, and damage, and while providing an additional resting surface for the palm of the user's gripping hand Facilitates one-handed computer user interface operation.

The system's compact, multi-device integrated design replaces conventional mouse and keyboard combinations, saving considerable desk space and coordination between multiple separate devices.

Optional voice confirmation announces keystroke as the user types, which facilitates use by the visually impaired and the young.

The system optionally includes a built-in SD card reader to adaptively configure for operation with various host computer stations.***

By way of practical example, note the illustration below:

Debbie is sick today and working from home. She's on her computer answering an urgent client email when the phone suddenly rings. It's her boss. He wants to go over something with her right away.

Because of the system 1 with ergonomically integrated user interface devices she is using, Debbie is able to easily finish the email and answer several others while on the phone with her boss—all without constantly moving her free hand back and forth between the mouse and her computer system's regular keyboard.

Although this invention has been described in connection with specific forms and embodiments thereof, it will be appreciated that various modifications other than those discussed above may be resorted to without departing from the spirit or scope of the invention as defined herein. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined herein.

What is claimed is:

1. A system having ergonomic handheld integration of multiple user interface devices, comprising:
    a housing defining an internal compartment and including an upper frame extending over the internal compartment, said upper frame defining a peripheral portion and an intermediate support portion, the intermediate support portion being at least partially raised above the peripheral portion;
    a pointing device portion coupled to said housing, said pointing device portion including a positional tracking sensor disposed in the internal compartment and at least one control button coupled in depressible manner to said upper frame;
    a keyboard portion coupled to said housing, said keyboard portion having a plurality of keys distributed over at least first and second keyboard sections to collectively define a substantially complete keyboard of predetermined type, said first and second keyboard sections being divided by the intermediate support portion extending therebetween; and,
    a shield member displaceably coupled to said housing, said shield member being selectively displaceable between at least first and second positions, said shield member in the first position covering at least a portion of said first keyboard section to block actuation of the keys thereof, and said shield member in the second position covering at least a portion of said second keyboard section to block actuation of the keys thereof.

2. The system as recited in claim 1, wherein the predetermined type for said keyboard portion is selected from the group consisting of: QWERTY, AZERTY, QWERTZ, Dvorak, Colemak, Maltron, and JCUKEN keyboard types.

3. The system as recited in claim 1, wherein said first and second keyboard sections respectively form forward and rear keyboard sections exposed through said upper frame of said housing, intermediate support portion extending laterally between said forward and rear keyboard sections.

4. The system as recited in claim 1, wherein said pointing device portion defines a computer mouse device, and said positional tracking sensor thereof includes an LED component transceiving a sensing signal through a window formed in said housing.

5. The system as recited in claim 1, wherein said shield member is pivotally coupled to said housing for angular displacement between the first and second positions.

6. The system as recited in claim 1, further comprising an audio switch coupled to said housing, said audio switch being manually actuable to activate audio feedback responsive to a keystroke executed on said keyboard portion.

7. The system as recited in claim 1, further comprising a storage media port coupled to said housing, said storage media port being configured to receive a portable data storage device for reading data therefrom.

8. The system as recited in claim 7, wherein said housing includes a base part supporting said upper frame extending thereover, said storage media port being disposed in the internal compartment of said housing to be accessible through said base part to receive the portable data storage device.

9. A handheld system having ergonomic integration of multiple user interface devices, comprising:
    a housing including an upper frame and a base part coupled thereto to define an internal compartment therebetween, said upper frame having a peripheral portion and an intermediate support portion protruding upward across the peripheral portion to define a humped upper profile;
    a pointing device portion coupled to said housing, said pointing device portion including a positional tracking sensor disposed in the internal compartment and at least one control button coupled in depressible manner to said upper frame;
    a keyboard portion coupled to said housing, said keyboard portion having a plurality of keys distributed over a forward keyboard section and a rear keyboard section to collectively define a substantially complete keyboard of predetermined type, said forward and rear keyboard sections being exposed through said upper frame of said housing and divided by the intermediate support portion extending laterally therebetween, the intermediate support portion defining a raised surface for resting a part of a user's hand when gripping and operating either of the pointing device and keyboard portions; and,
    a shield member displaceably coupled to said housing, said shield member being selectively displaceable between at least first and second positions, said shield member in the first position covering at least a portion of said forward keyboard section to block actuation of the keys thereof, and said shield member in the second position covering at least a portion of said rear keyboard section to block actuation of the keys thereof.

10. The handheld system as recited in claim 9, wherein the predetermined type for said keyboard portion is selected from the group consisting of: QWERTY, AZERTY, QWERTZ, Dvorak, Colemak, Maltron, and JCUKEN keyboard types.

11. The handheld system as recited in claim 9, wherein said pointing device portion defines a computer mouse device, and said positional tracking sensor thereof includes an LED component transceiving a sensing signal through a window formed in said base part of said housing.

12. The handheld system as recited in claim 9, wherein said shield member is pivotally coupled to said housing for angular displacement between the first and second positions.

13. The handheld system as recited in claim 11, further comprising an audio switch coupled to said housing, said audio switch being manually actuable to activate audio feedback responsive to a keystroke executed on said keyboard portion.

14. The handheld system as recited in claim 11, further comprising a storage media port disposed in the internal compailinent of said housing, said storage media port being configured to receive a portable data storage device for reading data therefrom, said storage media port being accessible through said base part of said housing to receive the portable data storage device.

15. A system having ergonomic handheld integration of multiple user interface devices, comprising:
- a housing including an upper frame and a base part coupled thereto to define an internal compartment therebetween, said upper frame having a peripheral portion and an intermediate support portion extending across the peripheral portion, the intermediate support portion being at least partially raised above the peripheral portion;
- a mouse portion coupled to said housing, said mouse portion including a positional tracking sensor disposed in the internal compartment and at least one control button coupled in depressible manner to said upper frame;
- a keyboard portion coupled to said housing, said keyboard portion having a plurality of keys distributed over at least forward and rear keyboard sections to collectively define a substantially complete keyboard of predetermined type, said forward and rear keyboard sections being divided by the intermediate support portion extending laterally therebetween; and,
- a shield member displaceably coupled to said housing, said shield member being selectively displaceable between at least first and second positions, said shield member in the first position covering at least a portion of said forward keyboard section to block actuation of the keys thereof, and said shield member in the second position covering at least a portion of said rear keyboard section to block actuation of the keys thereof;
- wherein the predetermined type for said keyboard portion is selected from the group consisting of: QWERTY, AZERTY, QWERTZ, Dvorak, Colemak, Maltron, and JCUKEN keyboard types.

16. The system as recited in claim 15, wherein said shield member is pivotally coupled to said housing for angular displacement between the first and second positions.

17. The system as recited in claim 15, further comprising:
- an audio switch coupled to said housing, said audio switch being manually actuable to activate audio feedback responsive to a keystroke executed on said keyboard portion; and,
- a storage media port disposed in the internal compartment of said housing, said storage media port being configured to receive a portable data storage device for reading data therefrom, said storage media port being accessible through said base part of said housing to receive the portable data storage device.

* * * * *